United States Patent
Boltz et al.

(10) Patent No.: US 12,503,376 B2
(45) Date of Patent: Dec. 23, 2025

(54) NANOPARTICLE-ENTRAINED MULTIFUNCTIONAL NANOSTRUCTURE-COATED MOBILE CARRIERS, AND SYSTEMS AND METHODS OF UTILIZING SAME TO TREAT CONTAMINATED WATER

(71) Applicant: Woodard & Curran, Inc., Portland, ME (US)

(72) Inventors: Joshua P. Boltz, Foley, AL (US); Gregory K. Parks, Davenport, FL (US); Raj Vaidya, Tampa, FL (US)

(73) Assignee: Woodard & Curran, Inc., Portland, ME (US)

( * ) Notice: Subject to any disclaimer, the term of this patent is extended or adjusted under 35 U.S.C. 154(b) by 404 days.

(21) Appl. No.: 18/160,687

(22) Filed: Jan. 27, 2023

(65) Prior Publication Data
US 2024/0254011 A1     Aug. 1, 2024

(51) Int. Cl.
| | |
|---|---|
| *C02F 1/26* | (2023.01) |
| *C02F 1/42* | (2023.01) |
| *C02F 1/58* | (2023.01) |
| *C02F 1/66* | (2023.01) |
| *C02F 101/10* | (2006.01) |
| *C02F 101/16* | (2006.01) |

(52) U.S. Cl.
CPC .............. *C02F 1/26* (2013.01); *C02F 1/42* (2013.01); *C02F 1/58* (2013.01); *C02F 1/66* (2013.01); *C02F 2101/105* (2013.01); *C02F 2101/16* (2013.01); *C02F 2209/06* (2013.01); *C02F 2303/04* (2013.01); *C02F 2305/08* (2013.01)

(58) Field of Classification Search
CPC .. C02F 1/26; C02F 1/281; C02F 1/288; C02F 1/42; C02F 1/58; C02F 1/66; C02F 2101/105; C02F 2101/16; C02F 2209/06; C02F 2303/04; C02F 2305/08
See application file for complete search history.

(56) References Cited

U.S. PATENT DOCUMENTS

| | | |
|---|---|---|
| 9,670,083 B2 | 6/2017 | Wett et al. |
| 9,802,847 B2 | 10/2017 | Murthy et al. |
| 10,138,148 B2 | 11/2018 | Boltz et al. |
| 2001/0023849 A1 | 9/2001 | Robertson |
| 2002/0162797 A1 | 11/2002 | Johnson et al. |
| 2002/0187082 A1 | 12/2002 | Wu et al. |

(Continued)

FOREIGN PATENT DOCUMENTS

| | | |
|---|---|---|
| GB | 1584373 A | 2/1981 |
| IN | 03972DE2014 A | 8/2016 |

(Continued)

OTHER PUBLICATIONS

Boltz, J.P. and Daigger, G.T. (2022). A mobile-organic biofilm process for wastewater treatment. Water Environment Research. DOI: 10.1002/wer.10792.

(Continued)

*Primary Examiner* — Dirk R Bass
(74) *Attorney, Agent, or Firm* — Pierce Atwood LLP; Christopher A. Baxter

(57) ABSTRACT

The disclosure provides nanoparticle-entrained multifunctional nanostructure-coated mobile carriers, and systems and methods of utilizing the mobile carriers to treat contaminated water.

52 Claims, 8 Drawing Sheets

(56) References Cited

U.S. PATENT DOCUMENTS

2019/0256376 A1    8/2019    Leshuk et al.

FOREIGN PATENT DOCUMENTS

| IN | 3972/DEL/2014 A | 8/2016 |
| WO | 2021173608 A1 | 9/2021 |

OTHER PUBLICATIONS

Ribet, S.M. et al. (2021). Phosphate Elimination and Recovery Lightweight (PEARL) Membrane: a sustainable environmental remediation approach. PNAS. vol 118. No. 23. DOI: 10.1073/pnas.2102583118.
USGS, United States Geological Survey (2022). Phosphate Rock. Mineral commodity summaries.
Zapata, F. and Roy, R.N. (2004). Phosphorus in the soil-plant system. Chapter 1 in Use of Phosphate Rocks for Sustainable Agriculture. Rome: Food and Agriculture Organization of the United Nations. ISBN 92-5-105030-9.
USGS, United States Geological Survey (2022). Nitrogen (Fixed)—Ammonia. Mineral commodity summaries.
International Search Report and Written Opinion dated Jul. 31, 2024 in Int'l Appl. No. PCT/US2024/012506, 15 pages.
Invitation to Pay Additional Fees dated Apr. 18, 2024 from corresponding International Application No. PCT/US2024/012506.

NANOPARTICLE-ENTRAINED MULTIFUNCTIONAL NANOSTRUCTURE-COATED MOBILE CARRIERS, AND SYSTEMS AND METHODS OF UTILIZING SAME TO TREAT CONTAMINATED WATER

FIELD

Aspects of the present disclosure provide nanoparticle-entrained multifunctional nanostructure-coated mobile carriers, and systems and methods of utilizing the mobile carriers to treat contaminated water.

BACKGROUND

Contaminated water treatment depends on the source and nature of the contaminant(s) and involves a series of processing steps that are arranged to meet a specific treatment objective, or objectives, with a minimum physical footprint and total life-cycle cost [i.e., the combination of capital and operating costs for a pre-determined operating life (e.g., 20 years)]. Contaminated waters include, but are not limited to, reclaimed water, potable water, storm water, agricultural wastewater, municipal wastewater, and industrial wastewater, such as the wastewaters that are produced by food production and manufacturing. These contaminated waters may contain particulate and dissolved organic matter, nitrogen, phosphorus, metals, and/or metalloids. These materials may have societal and monetary value. Nitrogen and phosphorus, for example, are primary components of fertilizers.

Phosphate rock reacts with sulfuric acid to form phosphoric acid. More than 95% of phosphate rock that was mined in the U.S.A. during 2021 was utilized to produce phosphoric acid for the manufacture of ammonium phosphate fertilizers and animal feed supplements. In 2021, the commercial extraction of phosphate rock from mines located in the U.S.A. resulted in an estimated 22-million metric tons of marketable product that was valued at $1.65 billion (i.e., $75/metric ton of phosphate rock) (USGS, United States Geological Survey (2022). *Phosphate Rock*. Mineral commodity summaries). The orthophosphate content of marketed phosphate rock is approximately 30% (Zapata, F., Roy, R. N. (2004). Phosphorus in the soil-plant system. Chapter 1 in *Use of Phosphate Rocks for Sustainable Agriculture*. Rome: Food and Agriculture Organization. ISBN 92-5-105030-9). Therefore, the average value of orthophosphate that was mined in the U.S.A. during 2021 was $250 per metric ton.

Nitrogen (N) is commercially recovered from the air as ammonia ($NH_3$), which is produced by combining nitrogen in the atmosphere with hydrogen from natural gas. In 2021, the U.S.A. produced 14-million metric tons of ammonia, which was approximately 10% of global ammonia production. Urea, ammonium nitrate, nitric acid, ammonium phosphates, and ammonium sulfate were, in descending order of importance, the major derivatives of ammonia produced in the U.S.A. The average ammonia price for 2021 was estimated to be $510 per short ton, which is significantly greater than the $220 per short ton estimated average price in 2020. Ammonia prices fluctuate with natural gas prices. Approximately 88% of apparent ammonia consumption in the U.S.A. was for use as fertilizers, including anhydrous ammonia for direct application, urea, ammonium nitrates, ammonium phosphates, and other nitrogen compounds. Ammonia also was used to produce explosives, plastics, synthetic fibers and resins, and numerous other chemical compounds (USGS, United States Geological Survey (2022). *Nitrogen (Fixed)—Ammonia*. Mineral commodity summaries).

Nanoparticles are particles of matter that typically have equivalent spherical diameters that are in the order of 1 to 100 nanometers. Certain nanoparticles can adsorb and desorb cations and anions, which is useful for contaminated water treatment and resource recovery. However, nanoparticles are difficult to capture and retain in a contaminated water treatment process. Iron oxide nanoparticles, for example, are magnetic and can adsorb and desorb (oxy) anions that include, but are not limited to, chromate ($CrO_4^{2-}$), arsenate ($AsO_4^{3-}$), selenate ($SeO_4^{2-}$), orthovanadate ($VO_4^{3-}$), and orthophosphate ($PO_4^{3-}$). Magnetite ($Fe_3O_4$) is a common form of iron oxide that may be utilized to adsorb and desorb anionic contaminants from water. Zeolite nanoparticles, for example, are hydrated aluminosilicates of sodium, potassium, calcium, and barium that may be utilized to adsorb and desorb cationic contaminants from contaminated water, including, but not limited to, calcium ($Ca^{2+}$), magnesium ($Mg^{2+}$), and ammonium ($NH_4^+$). Some naturally occurring materials can adsorb and desorb contaminants in water, but manufactured ion-exchange resins are most utilized for this purpose. Nanoparticles that adsorb and desorb contaminants from water (e.g., iron oxide and zeolite) can be bound in a multifunctional nanostructure (MNS) that can coat a variety of surfaces (Ribet, S. M., Shindel, B., dos Reis, R., Nandwana, V., Dravid, V. P. (2021). Phosphate elimination and recovery lightweight (PEARL) membrane: a sustainable environmental remediation approach. *PNAS*. DOI: 10.1073/pnas.2102583118).

WO 2021/173608 A1 describes a method for making and utilizing a nanoparticle entrained MNS for the removal and recovery of a contaminant, or contaminants, from water. The nanoparticles may be comprised of iron, iron oxide, or an alloy of iron or iron oxide. Combinations of different types of magnetic nanoparticles can be utilized and the nanoparticles can have different compositions, sizes, and/or functionalization states. The coated porous material may be composed of polyurethane, cellulose, melamine, acrylic, polyamide, polyester, polycarbonate, polyaramide, or a combination thereof. Also, the coated porous material may have a solid matrix that is composed of a hydrophilic polymer. WO 2021/173608 A1 describes a method of removing a contaminant, or contaminants, from water by contacting a magnetic particle entrained MNS coated porous material with water containing a contaminant, or contaminants, for a period that is required to adsorb the contaminant, or contaminants, onto the magnetic particle entrained MNS coated porous material. The contaminant may be or include a metal, metalloid, heavy metal, inorganic compound, phosphate (e.g., orthophosphate and/or di- and tri-phosphate), and/or nitrate. The method includes a way of desorbing the contaminant by adjusting the pH of the magnetic particle entrained MNS coated porous material. The type of vessel, through which water and contaminants pass, that was utilized to promote contact between the contaminated water and magnetic particle entrained MNS is a coated planar membrane or packed column. Alternatively, contact between the water and magnetic particle entrained MNS can occur by placing the coated porous material on or in contaminated water, if the coated porous material is in the form of a sheet or pad (e.g., wipe, mop head, or sponge).

Mobile carriers can be utilized for contaminated water treatment, typically have equivalent spherical diameters that are in the order of 100 to 10,000 micrometers, and can be comprised of lignocellulose (Boltz, J. P., Daigger, G. T.

(2022). A mobile-organic biofilm process for wastewater treatment. *Water Environment Research*. DOI: 10.1002/wer.10792).

U.S. Pat. No. 10,138,148 B2 describes systems and methods for the treatment of contaminated water with mobile-biofilm carriers disposed within a bioreactor. A solid-solid separation unit is adapted to receive an effluent stream from the bioreactor, wherein the effluent contains mobile carriers that are covered by biofilms and separate at least a portion of the mobile carriers and biofilms from the effluent and return them to the bioreactor. A second bioreactor can exist between the first bioreactor and the solid-solid separation unit. The second bioreactor has a first inlet that is adapted to receive the stream comprising migrating or mobile-biofilm carriers and biofilms from the solid-solid separation unit, a second inlet that is adapted to receive a second bioreactor influent, and an outlet for dispensing a second effluent to the first bioreactor. The bioreactors may have aerobic, anoxic, and/or anaerobic conditions, or any combination thereof. The treatment system may further be comprised of another unit for liquid and solids separations that is adapted to receive the stream comprising residual solids from the solid-solid separation unit and further separate the stream comprising residual solids into a secondary effluent and an underflow.

U.S. Pat. No. 9,802,847 B2 describes an apparatus and method that utilizes screens to retain solids in an activated sludge process (i.e., bioreactor and unit for liquid and solids separations) for wastewater treatment. The screens can be used to separate and retain solids based on size or compressibility. The screens can further be used to physically retain slow-growing microorganisms, faster settling organisms, and/or added materials that can be used as resin, sorbent, or catalyst to treat or remove constituents in the activated sludge process. A screen may be applied at any point in the system. A series of screens can be used to retain particles within an upper and lower size range. The bioreactor may have aerobic, anoxic, and/or anaerobic conditions, or any combination thereof. The screen may have a mesh size in the order of 10 to 1,000 micrometers.

SUMMARY

A first aspect of the present disclosure relates to a system for removing and recovering one or more contaminants from water, the system comprising a first reactor configured to receive contaminated water comprising one or more contaminants, wherein at least a portion of the one or more contaminants have net charges; receive a solution comprising one or more acids or one or more bases configured to cause the contaminated water to have a first desired target pH; receive one or more mobile carriers comprising a core coated with a porous and non-reactive binding agent comprising one or more types of nanoparticles configured to become at least one of physically and chemically associated with the one or more contaminants; and output a first reactor effluent comprising water, having the first desired pH, and the one or more mobile carriers being at least one of physically and chemically associated with the one or more contaminants. The first of the first aspect further comprises a first solid-solid separation unit configured to separate the first reactor effluent into a first effluent and a second effluent, wherein: the first effluent, of the first solid-solid separation unit, comprises water having the first desired pH, and is at least substantially free of the one or more mobile carriers and the one or more contaminant; and the second effluent, of the first solid-solid separation unit, has the first desired pH and comprises the one or more mobile carriers being at least one of physically and chemically associated with the one or more contaminants. The system of the first aspect further comprises a second reactor in fluidic communication with the first solid-solid separation unit, the second reactor configured to receive the second effluent of the first solid-solid separation unit; receive a solution comprising at least one of one or more bases and one or more brines configured to cause the second effluent, of the first solid-solid separation unit, to have a second desired pH; and output a second reactor effluent having the second desired pH and comprising the one or more contaminants separated from the one or more mobile carriers. The system of the first aspect further comprises a second solid-solid separation unit configured to separate the second reactor effluent into first and second effluents of the second solid-solid separation unit, wherein: the first effluent, of the second solid-solid separation unit, comprises the one or more mobile carriers; and the second effluent, of the second solid-solid separation unit, has the second desired pH and comprises the one or more contaminants.

In some embodiments of the first aspect, the one or more contaminants comprise one or more mixtures of phosphates, one or more ammonium salts, or a combination of any two or more thereof.

In some embodiments of the first aspect, the one or more phosphates comprise one or more of orthophosphate, di-phosphate, and tri-phosphate.

In some embodiments of the first aspect, the contaminated water is combined with the solution comprising one or more acids or one or more bases and the one or more mobile carriers prior to being input to the first reactor.

In some embodiments of the first aspect, the first reactor is configured to mix the contaminated water, the solution comprising one or more acids or one or more bases, and the one or more mobile carriers to facilitate surface-based reactions between the one or more mobile carriers and the one or more contaminants.

In some embodiments of the first aspect, at least a portion of the first effluent, of the first solid-solid separation unit, is input to the first reactor.

In some embodiments of the first aspect, at least a portion of the first effluent, of the first solid-solid separation unit, is combined with the contaminated water prior to being input to the first reactor.

In some embodiments of the first aspect, a solution comprising one or more bases or one or more acids is added to at least a portion of the first effluent, of the first solid-solid separation unit, to produce treated water.

In some embodiments of the first aspect, the system further comprises a disinfection unit configured to receive the treated water, wherein the disinfection unit is configured to destroy residual organic compounds in the treated water.

In some embodiments of the first aspect, the system further comprises a liquid-solid separation unit configured to receive the first effluent, of the first solid-solid separation unit, and separate one or more solids from water in the first effluent of the first solid-solid separation unit, wherein the solution comprising one or more bases or one or more acids is added to the water output from the liquid-solid separation unit.

In some embodiments of the first aspect, the second reactor is configured to agitate the second effluent, of the first solid-solid separation unit, and the solution comprising at least one of one or more bases and one or more bases to cause the one or more contaminants to separate from the one or more mobile carriers.

In some embodiments of the first aspect, at least a portion of the second effluent, of the second solid-solid separation unit, is input to the second reactor.

In some embodiments of the first aspect, at least a portion of the second effluent, of the second solid-solid separation unit, is combined with the second effluent, of the first solid-solid separation unit, prior to being input to the second reactor.

In some embodiments of the first aspect, the solution comprising at least one of one or more bases and one or more brines is combined with the second effluent, of the first solid-solid separation unit, prior to being input to the second reactor.

In some embodiments of the first aspect, the first effluent, of the second solid-solid separation unit, is input to the first reactor.

In some embodiments of the first aspect, the first effluent, of the second solid-solid separation unit, is combined with the contaminated water prior to being input to the first reactor.

In some embodiments of the first aspect, the first solid-solid separation unit is configured to use screening, hydrocyclone separation, sedimentation, clarification, membrane filtration, and cloth-disc type filtration, or a combination of any two or more thereof.

In some embodiments of the first aspect, the second solid-solid separation unit is configured to use screening, hydrocyclone separation, sedimentation, clarification, membrane filtration, classification, and cloth-disc type filtration, or a combination of any two or more thereof.

In some embodiments of the first aspect, the one or more mobile carriers occupy up to 100% of a volume of the first reactor.

In some embodiments of the first aspect, the one or more mobile carriers occupy up to 100% of a volume of the second reactor.

In some embodiments of the first aspect, the one or more mobile carriers are 1% to 100% of total suspended solids in the first reactor.

In some embodiments of the first aspect, the one or more mobile carriers are 1% to 100% of total suspended solids in the second reactor.

In some embodiments of the first aspect, the first reactor is partitioned to perform two or more processes in series.

In some embodiments of the first aspect, the first reactor is partitioned to perform two or more processes in parallel.

In some embodiments of the first aspect, the first reactor has a hydraulic retention time of 0.1 to 100 hours.

In some embodiments of the first aspect, the first reactor is mixed to have a velocity gradient of 1 to 1,000,000/s.

In some embodiments of the first aspect, the second reactor is partitioned to perform two more processes in series.

In some embodiments of the first aspect, the second reactor is partitioned to perform two more processes in parallel.

In some embodiments of the first aspect, the second reactor has a hydraulic retention time of 0.1 to 100 hours.

In some embodiments of the first aspect, the system further comprises a disinfection unit configured to receive at least a portion of the second effluent of the second solid-solid separation unit, wherein the disinfection unit is configured to destroy residual organic compounds in the at least a portion of the second effluent of the second solid-solid separation unit.

In some embodiments of the first aspect, the system further comprises a oxidation unit configured to receive at least a portion of the second effluent of the first solid-solid separation unit.

In some embodiments of the first aspect, the system further comprises a liquid-solid separation unit configured to receive the second effluent, of the second solid-solid separation unit, and separate the one or more contaminants from water in the second effluent of the second solid-solid separation unit.

In some embodiments of the first aspect, the system further comprises a concentrator unit configured to receive the second effluent, of the second solid-solid separation unit.

In some embodiments of the first aspect, the system further comprises a third reactor in fluidic communication with the second solid-solid separation unit, the third reactor configured to: receive the second effluent of the second solid-solid separation unit; receive a solution comprising at least one of one or more alkaline earth metal salts, one or more acids, and one or more bases; and output a treated water comprising one or more contaminant particles.

In some embodiments of the first aspect, the one or more alkaline earth metal salts comprise one or more calcium salts, one or more magnesium salts, one or more potassium salts, one or more aluminum salts, one or more iron salts, one or more copper salts, or a combination of any two or more thereof.

In some embodiments of the first aspect, the system further comprises a liquid-solid separation unit configured to separate the treated water from the one or more contaminant particles.

In some embodiments of the first aspect, the system further comprises a concentrator unit configured to separate the treated water from the one or more contaminant particles.

In some embodiments of the first aspect, the system further comprises at least one of a liquid-solid separation unit and a concentrator unit disposed in fluidic communication between the first reactor and the first solid-solid separation unit, wherein: the at least one of the liquid-solid separation unit and the concentrator unit outputs a first effluent comprising water having the first desired pH, the first effluent being at least substantially free of the one or more mobile carriers and the one or more contaminants; the at least one of the liquid-solid separation unit and the concentrator unit outputs a second effluent having the first desired pH and comprising the one or more mobile carriers having the one or more contaminants; and the second effluent, of the liquid-solid separation unit is input to the first solid-solid separation unit.

In some embodiments of the first aspect, the first desired pH is equal to or less than 8.

In some embodiments of the first aspect, the second desired pH is equal to or greater than 7.

In some embodiments of the first aspect, the one or more mobile carriers comprise a first mobile carrier comprising a core coated with a porous and non-reactive binding agent comprising one or more types of nanoparticles, wherein at least one of the first mobile carrier has a density of 0.01 to 20 g/cm$^3$, the first mobile carrier has a dimension of 1 to 12,500 microns, and the porous and non-reactive binding agent has a thickness of 0.001 to 1,000 microns.

In some embodiments of the first aspect, a shape of the first mobile carrier is formed through one or more physical processes, one or more chemical processes, one or more physical-chemical processes, or a combination of any two or more thereof.

In some embodiments of the first aspect, the first mobile carrier has a naturally occurring shape.

In some embodiments of the first aspect, a size of the first mobile carrier is formed through one or more physical processes, one or more chemical processes, one or more physical-chemical processes, or a combination of any two or more thereof.

In some embodiments of the first aspect, a porosity of the first mobile carrier is formed through one or more physical processes, one or more chemical processes, one or more physical-chemical processes, or a combination of any two or more thereof.

In some embodiments of the first aspect, the first mobile carrier has a net negative charge.

In some embodiments of the first aspect, the first mobile carrier has a net positive charge.

In some embodiments of the first aspect, the core is formed through one or more physical processes, one or more chemical processes, one or more physical-chemical processes, or a combination of any two or more thereof.

In some embodiments of the first aspect, the core is naturally occurring.

In some embodiments of the first aspect, the core comprises one or more hydrophobic polymers, gypsum, lignocellulose, hemicellulose, basalt, bauxite, graphite, cera alba, bone, or a combination of any two or more thereof.

In some embodiments of the first aspect, the porous and non-reactive binding agent further comprises one or more magnetic nanoparticles, carbon, one or more carbon-containing compounds, one or more ceramics, one or more metals, one or more metal oxides, one or more polymers, one or more zeolites, one or more ion exchange resins, or a combination of any two or more thereof.

In some embodiments of the first aspect, the porous and non-reactive binding agent comprises one or more magnetic nanoparticles and one or more ion exchange resins.

A second aspect of the present disclosure relates to a mobile carrier for removing and recovering one or more contaminants from water, the mobile carrier comprising a core coated with a porous and non-reactive binding agent comprising one or more types of nanoparticles, wherein at least one of the mobile carrier has a density of 0.01 to 20 g/cm$^3$, the mobile carrier has a dimension of 1 to 12,500 microns, and the porous and non-reactive binding agent has a thickness of 0.001 to 1,000 microns.

In some embodiments of the second aspect, a shape of the mobile carrier is formed through one or more physical processes, one or more chemical processes, one or more physical-chemical processes, or a combination of any two or more thereof.

In some embodiments of the second aspect, the mobile carrier has a naturally occurring shape.

In some embodiments of the second aspect, a size of the mobile carrier is formed through one or more physical processes, one or more chemical processes, one or more physical-chemical processes, or a combination of any two or more thereof.

In some embodiments of the second aspect, a porosity of the mobile carrier is formed through one or more physical processes, one or more chemical processes, one or more physical-chemical processes, or a combination of any two or more thereof.

In some embodiments of the second aspect, the mobile carrier has a net negative charge.

In some embodiments of the second aspect, the mobile carrier has a net positive charge.

In some embodiments of the second aspect, the core is formed through one or more physical processes, one or more chemical processes, one or more physical-chemical processes, or a combination of any two or more thereof.

In some embodiments of the second aspect, the core is naturally occurring.

In some embodiments of the second aspect, the core comprises one or more hydrophobic polymers, gypsum, lignocellulose, hemicellulose, basalt, bauxite, graphite, cera alba, bone, or a combination of any two or more thereof.

In some embodiments of the second aspect, the porous and non-reactive binding agent further comprises one or more magnetic nanoparticles, carbon, one or more carbon-containing compounds, one or more ceramics, one or more metals, one or more metal oxides, one or more polymers, one or more zeolites, one or more ion exchange resins, or a combination of any two or more thereof.

In some embodiments of the second aspect, the porous and non-reactive binding agent comprises one or more magnetic nanoparticles and one or more ion exchange resins.

DETAILED DESCRIPTION

Figure 1:
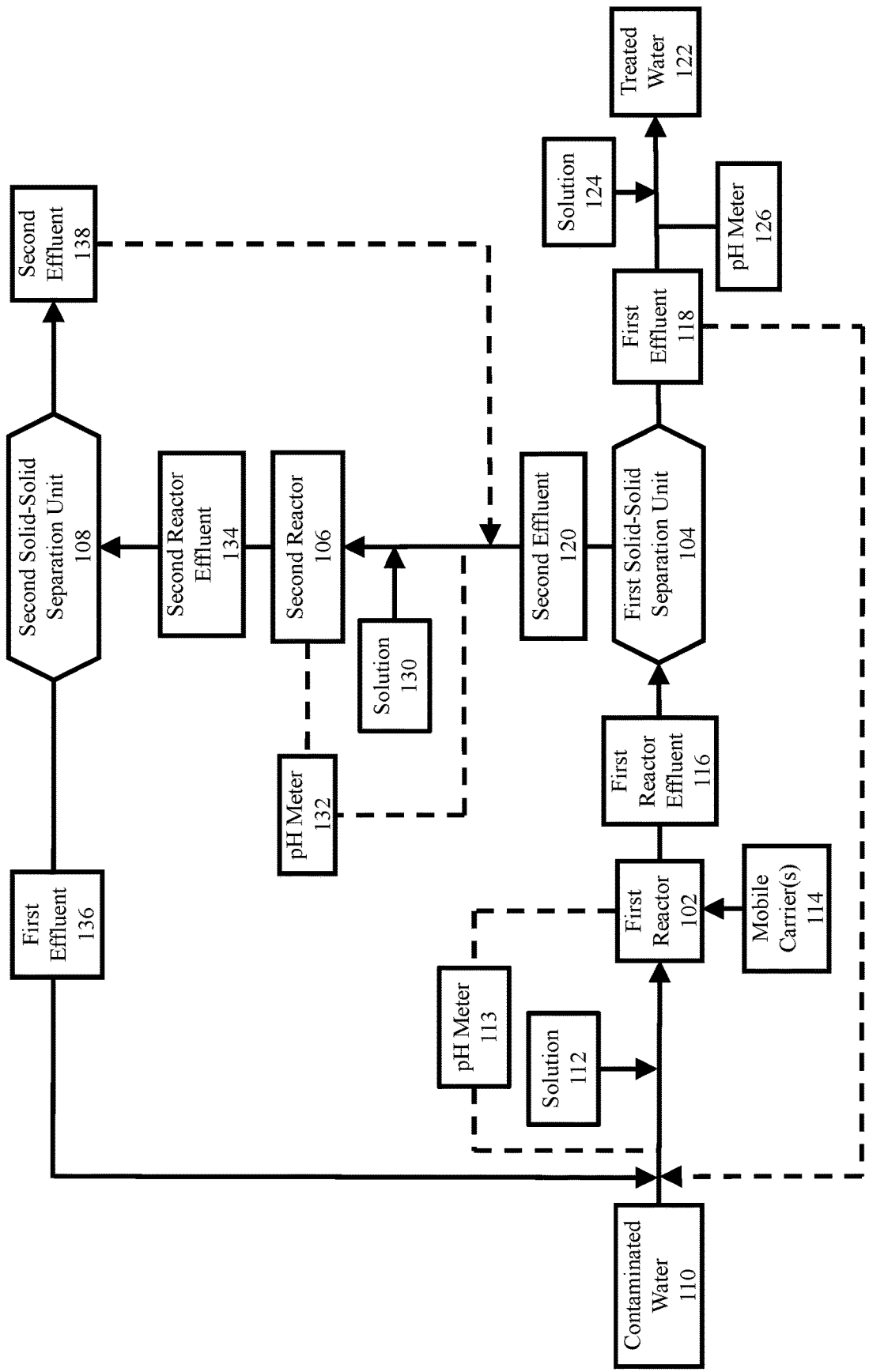
FIG. 1 is a schematic drawing of an example system configuration according to various embodiments of the present disclosure.

The present disclosure provides nanoparticle-entrained MNS-coated mobile carriers, and systems and methods of utilizing the mobile carriers to treat contaminated water.

Mobile Carriers

As used herein, a "mobile carrier" means a core coated with a porous and non-reactive MNS that includes one or more types of nanoparticles configured to physically and/or chemically associate with (e.g., adsorb, bind through ion exchange, precipitate, and/or desorb) one or more contaminants in contaminated water. The mobile carrier of the present disclosure can move into, within, and out of wastewater treatment reactors and separation units along with water and contaminants.

A mobile carrier of the present disclosure may have a density of 0.01 to 20 $g/cm^3$ and/or a dimension (e.g., thickness or diameter) of 1 to 12,500 microns, and the porous and non-reactive binding agent may have a thickness of 0.001 to 1,000 microns. While a density range of 0.01 to 20 $g/cm^3$ is noted above, the present disclosure envisions any range of densities where the lower limit of the range is at least 0.01 $g/cm^3$ and the upper limit of the range is at most 20 $g/cm^3$. Moreover, while a dimension range of 1 to 12,500 microns is noted above, the present disclosure envisions any range of dimensions where the lower limit of the range is at least 1 micron and the upper limit of the range is at most 12,500 microns. Further, while a thickness range of 0.001 to 1,000 microns is noted above, the present disclosure envisions any range of thicknesses where the lower limit of the range is at least 0.001 microns and the upper limit of the range is at most 1,000 microns.

In some embodiments, the core of the mobile carrier may be formed through one or more physical processes. In some embodiments, the core of the mobile carrier may be formed through one or more chemical processes. In some embodiments, the core of the mobile carrier may be formed through one or more physical-chemical processes. In some embodiments, the core of the mobile carrier may be formed through a combination of any two or more of one or more physical processes, one or more chemical processes, and one or more physical-chemical processes.

In some embodiments, the core of the mobile carrier is a naturally-occurring composition.

In some embodiments, the core may be partially formed from a naturally-occurring composition, and partially formed from an engineered composition (i.e., one that is formed from one or more of one or more physical processes, one or more chemical processes, and/or one or more physical-chemical processes).

The core of the mobile carrier may include one or more hydrophobic polymers. The core may include one or more inorganic polymers and/or one or more organic polymers. Example inorganic polymers, but are not limited to, polysiloxane, polyphophazene, and polyborazyline. Example organic polymers include, but are not limited to low-density polyethylene (LDPE), high-density polyethylene (HDPE), polypropylene (PP), polyvinyl chloride (PVC), polystyrene (PS), nylon (e.g., nylon 6 and nylon 6,6), polytretrafluoroethylene, and thermoplastic polyurethanes (TPUs).

The core of the mobile carrier may include gypsum, a soft sulfate mineral made of calcium sulfate dihydrate, and having the chemical formula $CaSO_4 \cdot 2H_2O$.

The core of the mobile carrier may include lignocellulose, a plant biomass of cellulose, hemicelluloses, and lignin where the cellulose and hemicellulose are tightly bound to the lignin.

The core of the mobile carrier may include hemicellulose, a heterogeneous polymer of sugars such as xylose, arabinose, mannose, and galactose.

The core of the mobile carrier may include basalt, a fine-grained extrusive igneous rock formed from rapid cooling of low-viscosity lava rich in magnesium and iron.

The core of the mobile carrier may include bauxite, a sedimentary rock with a relatively high aluminum content.

The core of the mobile carrier may include graphite, a crystalline form of carbon and consisting of stacked layers of graphene.

The core of the mobile carrier may include cera alba, a purified wax from bee honeycombs.

The core of the mobile carrier may include bone. The type of bone is not intended to be limited. The bone may be obtained from any type of bone-containing organism.

In some embodiments, the core of the mobile carrier may include a combination of any two or more of one or more hydrophobic polymers, gypsum, lignocellulose, hemicellulose, basalt, bauxite, graphite, cera alba, and bone.

A variety of porous and non-reactive binding agents may be used in the MNS coating of the mobile carrier. The porous binding agent may be composed of natural or synthetic materials; be woven or non-woven; and may assume a variety of forms.

The porous and non-reactive binding agent may be described as a solid matrix, the surface of which defines a plurality of pores distributed throughout. In some embodiments, the solid matrix may be characterized as being in the form of network of interconnected strands that extend (e.g., randomly, although regularly oriented strands such as those in woven textiles may be used) to define the plurality of pores and elongated, tortuous channels distributed throughout the solid matrix. The surfaces of the solid matrix may integrate one or more types of nanoparticles, which generally do not penetrate the solid matrix itself and/or rely on their ability to penetrate the solid matrix to be effective. These surfaces include outer/external surfaces generally facing away from the body of the solid matrix as well as inner/internal surfaces generally facing towards the interior body.

The size and shape of the pores may be selected depending upon the application. In some embodiments, the porous binding agent is hierarchical in nature. This means that the porous binding agent defines multiple sets of pores (e.g., 2, 3, etc.), each set characterized by a different average size. The phrase "average size" may refer to an average dimension (i.e., width or diameter) taken as the largest distance across opposing surfaces of the porous binding agent defining the pores. For example, a set of pores may be characterized as having an average dimension on the millimeter scale (e.g., in a range of from 1 mm to 10 mm). A set of pores may be characterized as having an average dimension on the micrometer scale (e.g., in a range of from 1 pm to 1000 pm). A set of pores may be characterized as having an average diameter on the nanometer scale (e.g., in a range of from 1 nm to 100 nm). A set of pores may be characterized as having an average diameter within the nanometer scale (e.g., in a range of from 1 nm to 20 nm). In some embodiments, the porous binding agent may include two or more such sets.

The porous and non-reactive binding agent may be composed of a variety of natural or synthetic materials (including combinations thereof). Illustrative materials for the porous binding agent include polyurethane, cellulose, melamine, polyimide, acrylic, polyamide, polyester, polycarbonate, and polyaramide. Embodiments of these materials have an advantage of being polymeric, flexible, and compressible. Hydrophilic materials are particularly useful (e.g., cellulose, melamine, and polyamide). However, hydrophilic materials may be combined with amphiphilic materials such as polyimide, polycarbonate, and polyurethane or combined with hydrophobic materials such as polyester, polyaramide, and acrylic. In some embodiments, the following materials are excluded: activated carbon, biochar, halloysite, silicate, calcium-silicate. Materials such as activated carbon and biochar are generally hydrophobic.

One or more types of nanoparticles may be integrated with the porous binding agent to form the mobile carrier.

Various nanoparticle masses may be integrated with the porous binding agent. In some embodiments, the loading may be in the range of 0.2 weight % to 25 weight %. Here, "weight %" is (weight of the nanoparticles)/(total weight of the coated porous material)*100. This includes from 0.5 weight % to 20 weight %, from 1 weight % to 25 weight %, from 1 weight % to 15 weight %, and from 5 weight % to 10 weight %. The loading may be tuned depending upon the application. The loading may also be tuned to provide a certain surface coverage of the magnetic nanoparticles on the porous binding agent. In some embodiments, the masses of the nanoparticles is that which allows for the formation of all surfaces (i.e., inner and outer surfaces) of the porous binding agent with a surface coverage of at least 90%, at least 95%, at least 99%, or 100%.

In some embodiments, the porous and non-reactive binding agent, of the MNS coating, may include one or more magnetic nanoparticles. Regarding the magnetic nanoparticles, a variety of magnetic materials may be used. In some embodiments, hard magnetic materials may be used. Example hard magnetic particles include, but are not limited to CoCrPt, Co, $Co_3Pt$, FePd, FePt, CoPt, CoPd, FeCo, MnAl, $Fe_{14}Nd_2B$, and $SmCo_5$. In some embodiments, soft magnetic materials may be used. Example soft magnetic materials include, but are not limited to $Fe_3O_4$, $MnFe_2O_4$, $NiFe_2O_4$, and $MgFe_2O_4$. Other soft magnetic materials include the following soft magnetic ferrite compounds having the formula $M'_xM''_{1-x}Fe_2O_4$, where M' and M'' are different and are independently selected from Co, Ni, Zn, Ba, Sr, Mg, Mn, and $0<x<1$. In some embodiments, $0.1<x<0.9$. Other soft magnetic materials include Fe—Si alloy, Ni— Fe alloy, and nano-crystalline alloy of Fe, Ni and/or Co with B, C, P, or Si.

The porous and non-reactive binding agent, of the MNS coating, may include nanoparticles having a variety of different sizes and shapes. Thus, the term "nanoparticles" is not meant to be limiting to a particular size. In some embodiments, the nanoparticles may have each of their three dimensions on the order of 1000 nm or less. The nanoparticles may be spherical, but this term encompasses irregularly shaped particles which are still reasonably well defined by three dimensions which are of similar magnitude. The nanoparticles may be characterized by an equivalent spherical diameter. The equivalent spherical diameter may be 500 nm or less, 200 nm or less, 100 nm or less, 50 nm or less, 25 nm or less, 10 nm or less, 5 nm, or in the range of from 1 nm to 100 nm, from 1 nm to 25 nm, or from 1 nm to 10 nm. In other embodiments, the equivalent spherical diameter may be in a range of from 1 nm to 200 nm, or from 10 nm to 200 nm. Magnetic nanoparticles having an equivalent spherical diameter of 10 nm or less are useful as they exhibit superparamagnetic behavior at room temperature (20 to 25° C.).

In some embodiments, the magnetic nanoparticles are functionalized. That is, they comprise a functional group that may be covalently bound to a surface of the magnetic nanoparticles. For example, the magnetic nanoparticles may be functionalized with chemical groups, such as a carboxylate, an amine, a phosphate, a pyridine, a sulfate; and/or biological groups such as amino acids, organic molecules, and antibodies. These groups can be either chemically (i.e., covalently) or physically (i.e., noncovalently) bonded to the magnetic nanoparticles. In some embodiments, the magnetic nanoparticles are unfunctionalized.

In some embodiments, the porous and non-reactive binding agent, of the MNS coating, may include one or more non-magnetic nanoparticles. Regarding the non-magnetic nanoparticles, a variety of non-magnetic materials may be used.

In some embodiments, the non-magnetic nanoparticles are functionalized. That is, they comprise a functional group that may be covalently bound to a surface of the non-magnetic nanoparticles. For example, the non-magnetic nanoparticles may be functionalized with chemical groups, such as a carboxylate, an amine, a phosphate, a pyridine, a sulfate; and/or biological groups such as amino acids, organic molecules, and antibodies. These groups can be either chemically (i.e., covalently) or physically (i.e., noncovalently) bonded to the non-magnetic nanoparticles. In some embodiments, the non-magnetic nanoparticles are unfunctionalized.

Combinations of different types of magnetic nanoparticles (e.g., magnetic nanoparticles having different compositions, different sizes, and/or different functionalization states) may be used on a single mobile carrier or across mobile carriers.

Combinations of different types of non-magnetic nanoparticles (e.g., non-magnetic nanoparticles having different compositions, different sizes, and/or different functionalization states) may be used on a single mobile carrier or across mobile carriers.

Combinations of different types of magnetic and non-magnetic nanoparticles (e.g., magnetic and non-magnetic nanoparticles having different compositions, different sizes, and/or different functionalization states) may be used on a single mobile carrier or across mobile carriers.

A variety of methods may be used to form the nanoparticles. By way of illustration, an oxidizing agent (e.g., a base such as NaOH) may be added to an aqueous solution of iron salts for a period to time to induce nucleation and growth of iron oxide nanoparticles. However, other methods may be used.

In some embodiments, the nanoparticles may include or consist of carbon and/or one or more carbon-containing compounds. For example, the nanoparticles may consist of any form of activated carbon and/or graphite.

In some embodiments, the nanoparticles may include or consist of one or more ceramics. Ceramics are hard, brittle, heat-resistant, and corrosion-resistant materials made by shaping and then firing an inorganic, nonmetallic material (e.g., clay) at a high temperature. Example ceramics include, but are not limited to, earthenware, porcelain, and brick.

In some embodiments, the nanoparticles may include or consist of oxygen-containing compounds that are hydrophilic and polar. Example oxygen-containing materials silica gel, calcium carbonate, and zeolites.

In some embodiments, the nanoparticles may include or consist of one or more metals and/or one or more metal oxides. Examples include, but are not limited to iron, nickel, cobalt, gadolinium, dysprosium, terbium, and magnetite.

In some embodiments, the nanoparticles may include or consist of one or more polymers. Example polymers include, but are not limited to cross-linked polystyrene, sodium polystyrene sulfonate, polyAMPS, polyAPTAC, polyethylene amine, and styrene-divinylbenzene copolymer.

In some embodiments, the nanoparticles may include or consist of one or more zeolites, minerals that contain mainly aluminum and silicon compounds. Example zeolites include, but are not limited to, analcime, chabazite, clinoptilolite, erionite, ferrierite, heulandite, laumontite, mordenite, and phillipsite.

In some embodiments, the porous and non-reactive binding agent, of the MNS coating, may include one or more ion exchange resins, insoluble polymers containing a backbone of cross-linked polystyrene and side chains of ion-active groups. Example ion exchange resins include, but are not limited to, those utilizing cross-linked polystyrene, sodium polystyrene sulfonate, polyAMPS, polyAPTAC, polyethylene amine, and/or styrene-divinylbenzene copolymer.

In some embodiments, the porous and non-reactive binding agent, of the MNS coating, may include one or more magnetic nanoparticles and one or more ion exchange resins. For example, the binding agent may include one or more magnetic nanoparticles for phosphate (e.g., orthophosphate and/or di- and tri-phosphate) and/or ammonium salt adsorption, as well as one or more ammonium ion exchange resins.

In some embodiments, the porous and non-reactive binding agent, of the MNS coating, may include a combination of any two or more of one or more magnetic nanoparticles, carbon, one or more carbon-containing compounds, one or more ceramics, one or more metals, one or more metal oxides, one or more polymers, one or more zeolites, and one or more ion exchange resins.

In some embodiments, the mobile carrier may have an engineered shape. In other words, the shape of the mobile carrier may be formed through one or more physical processes, one or more chemical processes, one or more physical-chemical processes, or a combination of any two or more thereof. In other embodiments, the mobile carrier may have a naturally-occurring shape. For example, the mobile carrier may be spherical, spheroidal, cylindrical, cubic, etc.

In some embodiments, the mobile carrier may have an engineered size. In other words, the size of the mobile carrier may be formed through one or more physical processes, one or more chemical processes, one or more physical-chemical processes, or a combination of any two or more thereof.

In some embodiments, the mobile carrier may have an engineered porosity. In other words, the porosity of the mobile carrier may be formed through one or more physical processes, one or more chemical processes, one or more physical-chemical processes, or a combination of any two or more thereof. In the context of the present disclosure, porosity of the mobile carrier is the ability and capability of the mobile carrier to pass liquid through the overall volume of the solid shape of the mobile carrier with or without adsorption.

In some embodiments, the mobile carrier may have a net negative charge. In other embodiments, the mobile carrier may have a net positive charge. It will be appreciated that the net charge of the mobile carrier may be at least partially dependent on the contaminant(s) to be removed.

Confirmation of the net charge of the mobile carrier may be obtained by assessing the response of the mobile carrier to a magnet [e.g., a permanent magnet ($B_r$=200-2000 mT)]. An electromagnet may also be used. Confirmation of the magnetic nature may be carried out by exposing the mobile carrier to a magnetic field as low as 200 mT and confirming that the magnetic field induces motion of the mobile carrier.

Methods of making mobile carriers of the present disclosure are also provided. In some embodiments, making the mobile carriers includes immersing any of the disclosed porous binding agents in a formulation (e.g., a slurry) including any of the disclosed nanoparticles for a period to integrate the nanoparticles with the porous binding agent. Immersion may be accompanied by mixing the formulation, including by sonication or vortexing. Immersion may be carried out at room temperature (20 to 25° C.). The coated porous binding agent may then be heated at an elevated temperature (i.e., greater than room temperature) for a period to provide the nanoparticle-entrained MNS.

The porous and non-reactive binding agent need not be pre-treated (e.g., pre-treated with an acid). Using cellulose as an example, acid pretreatment leads to carboxylation of cellulose (i.e., the cellulose is functionalized with carboxylate groups). This, in turn, may lead to covalent bonds being formed between the carboxylated cellulose and the nanoparticles. In some embodiments, the porous binding agent is unfunctionalized. In some embodiments, the porous binding agent does not comprise carboxylate groups. In some embodiments, the (magnetic) nanoparticles are not covalently bound to the porous binding agent.

The mobile carriers may be used in a variety of applications. One such application is recovering contaminants, such as metals (e.g., chromium, copper, cadmium, and nickel), metalloids (e.g., arsenic and selenium), heavy metals (e.g., lead and mercury), and inorganic compounds (e.g., phosphates and ammonium) from contaminated water. However, in some embodiments, the mobile carriers may be used to recover only phosphates, rather than another contaminant, such as arsenic. The phrase "contaminated water" refers to solutions and mixtures comprising water (i.e., other components may be present along with the water). In addition, the phrase encompasses water, and solutions and mixtures thereof which may be suspected of being contaminated. The source of the contaminated water is not particularly limited. For example, the source may be wastewater from a facility, run-off from an industrial, household, or commercial site, or a body of water such as a pool, a pond, lake, ocean, creek, stream, river, etc.

As used herein in the context of the binding agents, "non-reactive" means the binding agent does not react with one or more contaminants in water. Rather, it is the other components of the MNS coating (e.g., one or more magnetic nanoparticles, carbon, one or more carbon-containing compounds, one or more ceramics, one or more metals, one or more metal oxides, one or more polymers, one or more zeolites, and/or one or more ion exchange resins) that react with the one or more contaminants in water.

Systems for Removing and Recovering One or More Contaminants from Water

In addition to the mobile carriers detailed above, the present disclosure also provides systems for removing and recovering one or more contaminants from water using the mobile carriers.

With reference to FIG. 1, a system of the present disclosure may include, among other things, a first reactor 102 in fluidic communication with a first solid-solid separation unit 104, which is in fluidic communication with a second reactor 106, which is in fluidic communication with a second solid-solid separation unit 108.

The first reactor 102 takes contaminated water 110 as influent. The contaminated water 110 may include any of one or more contaminants to be removed from the contaminated water 110 using the mobile carriers of the present disclosure. In some embodiments, at least some of the one or more contaminants may have net charges (i.e., have a net positive charge or a net negative charge). Example contaminants comprise those including one or more metals (e.g., chromium, copper, cadmium, and nickel), one or more metalloids (e.g., arsenic and selenium), one or more heavy metals (e.g., lead and mercury), and/or one or more inorganic compounds (e.g., phosphates and ammonium). In some embodiments, the contaminated water 110 may include one or more of phosphate and ammonium.

The first reactor 102 may also take as influent a solution 112 including one or more acids or one or more bases to cause the contaminated water 110/effluent of the first reactor 102 to have a desired pH for promoting physical and/or chemical association (e.g., adsorption, binding through ion exchange, and/or precipitation) of the one or more contaminants to one or more mobile carriers of the present disclosure. In some embodiments, the desired pH may be a mild basic, neutral, or acidic pH. For example, the desired pH may be equal to or less than 8, equal to or less than 7, equal to or less than 6, equal to or less than 5, equal to or less than 4, equal to or less than 3, equal to or less than 2, or equal to 1.

The system may include a pH meter 113 positioned to measure a pH of the contaminated water 110 and send, to an automated dispenser (not illustrated) of the solution 112, a signal that, based on an algorithm (which may including a mathematical function(s) and/or empirical function(s) and/or fuzzy logic and/or a machine learning-based computation(s)), indicates an amount of the solution 112 to be dispensed based on the pH currently being measured by the pH meter 113. An application of several acids or bases may be used in sequence and/or as a mixture(s) to create the solution 112, and the masses of each in the solution 112 can vary. A programmable logic controller (PLC) may be included with a pump that has a variable-speed motor. The PLC may be programmed to receive a signal from the pH meter 113 and run the pump until the signal reaches a desired value or tolerance.

The pH meter 113 may be positioned upstream of the first reactor 102 with respect to fluid flow of the system, or the pH meter 113 may be positioned within the first reactor 102. In some embodiments, the automated dispenser may be configured to dispense a first solution 112a including one or more acids and a second solution 112b including one or more bases, and the automated dispenser may selectively dispense one of the first solution 112a and the second solution 112b based on the signal received from the pH meter 113, the algorithm, and the desired pH to be achieved for the contaminated water 110/effluent of the first reactor 102.

The present disclosure is not to be limited to utilization of any particular acid(s) or base(s) for purposes of the solution 112. By way of example and not limitation, when the solution 112 includes one or more acids, the solution 112 may include one or more of sulfuric acid ($H_2SO_4$), hydrochloric acid (HCl), nitric acid ($HNO_3$), phosphoric acid ($H_3PO_4$), and citric acid ($C_6H_8O_7$). Further, by way of example and not limitation, when the solution 112 includes one or more bases, the solution 112 may include one or more of sodium hydroxide (NaOH), calcium hydroxide ($Ca(OH)_2$), and sodium carbonate ($Na_2CO_3$).

The first reactor 102 may also take one or more mobile carriers 114 of the present disclosure as influent. In some embodiments, the one or more mobile carriers 114 may be configured to adsorb the one or more contaminants via ionic or weak Vander Waals forces, bind the one or more contaminants via one or more physical processes and/or one or more chemical processes, and/or bind the one or more contaminants through ion exchange.

The one or more mobile carriers 114 may occupy various volumes of the first reactor 102. In some embodiments, the one or more mobile carriers 114 may be added in an amount such that the one or more mobile carriers 114 occupy up to 100%, 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% of the volume of the first reactor 102. In some embodiments, the one or more mobile carriers 114 may be added in an amount such that the one or more mobile carriers 114 occupy at least 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% of the volume of the first reactor 102. In some embodiments, the one or more mobile carriers 114 may be added in an amount such that the one or more mobile carriers 114 occupy between 1% and 100% of the volume of the first reactor 102. However, the present disclosure envisions the one or more mobile carriers 114 occupying any range of percentages of the volume of the first reactor 102, where the lower limit of the range is at least 1% and the upper limit of the range is at most 100%.

The one or more mobile carriers 114 may be various amounts of total suspended solids in the first reactor 102. In some embodiments, the one or more mobile carriers 114 may be added in an amount such that the one or more mobile carriers 114 are 1% and 100% of the total suspended solids in the first reactor 102. However, the present disclosure envisions the one or more mobile carriers 114 being any range of percentages of the total suspended solids in the first reactor 102, where the lower limit of the range is at least 1% and the upper limit of the range is at most 100%.

In some embodiments, the one or more mobile carriers 114 may be added directly to the first reactor 102. In other embodiments, the one or more mobile carriers 114 may be added to the system of the present disclosure upstream of the first reactor 102 with respect to fluid flow (e.g., the one or more mobile carriers 114 may be added to the contaminated water 110 prior to the contaminated water 110 being input to the first reactor 102.

In some embodiments, two or more of the contaminated water 110, the solution 112 including one or more acids or one or more bases, and the one or more mobile carriers 114 may be combined prior to being input to the first reactor 102. In some embodiments, the contaminated water 110 may be combined with the solution 112, and/or the one or more mobile carriers 114 prior to being input to the first reactor 102.

In some embodiments, each of the contaminated water 110, the solution 112 including one or more acids or one or more bases, and the one or more mobile carriers 114 may be separately input to the first reactor 102.

The first reactor 102 is not meant to be limited to any particular structural configuration. Rather, the first reactor 102 is intended to be any structural configuration capable of mixing the contaminated water 110, the solution 112 including one or more acids or one or more bases, and the one or more mobile carriers 114 to disperse the one or more mobile carriers 114 throughout the contaminated water 110 and facilitate surface-based reactions between the one or more mobile carriers 114 and the one or more contaminants in the contaminated water 110. For example and not limitation, the first reactor 102 may be a concrete or steel tank.

In some embodiments, the first reactor 102 may be partitioned. With respect to the first reactor 102, "partition" and "partitioned" means the first reactor 102 is separated into two or more zones. In some embodiments, zones are physically separated, for example, by one or more partitions, or walls. Partitions include weir walls, submerged weir walls, curtains, or other physical separation devices. In some embodiments, one or more partitions are positioned parallel to the direction of flow of the contaminated water 110 in the first reactor 102, thereby creating multiple first reactors in parallel. In other embodiments, one or more partitions are positioned perpendicular to the direction of flow of the contaminated water 110 in the first reactor 102, thereby creating multiple first reactors in series.

In some embodiments, the first reactor 102 may have a hydraulic retention time of 0.1 to 100 hours. However, the present disclosure envisions the first reactor 102 having any hydraulic retention time range, where the lower limit of the range is at least 0.1 hours and the upper limit of the range is at most 100 hours.

In some embodiments, the first reactor 102 may be mixed to have a velocity gradient of 1 to 1,000,000/s. However, the present disclosure envisions the first reactor 102 being mixed to have a velocity gradient within any range where the lower limit of the range is at least 1/s and the upper limit of the range is at most 1,000,000/s. The first reactor 102 can be mixed by a variety of means including, but not limited to, mechanical mixing, jet mixing, air mixing, and a combination of any two or more thereof.

The first reactor 102 outputs a first reactor effluent 116 including water, having the desired pH noted herein above (e.g., equal to or less than 8), and the one or more mobile carriers 114 having the one or more contaminants physically and/or chemically associated (e.g., adsorbed, bound through ion exchange, and/or precipitated) therewith.

In the example of FIG. 1, the first reactor effluent 116 is input to the first solid-solid separation unit 104. The first solid-solid separation unit 104 may be any device configured to perform one or more solid-solid separation processes that substantially or completely separates the first reactor effluent 116 into a first effluent 118 and a second effluent 120. The first effluent 118 includes substantially or wholly uncontaminated water (i.e., water at least substantially free of the one or more mobile carriers 114 and the one or more contaminants) having a desired pH noted herein above. The second effluent 120 also has a desired pH and includes the one or more mobile carriers 114 having the one or more contaminants physically and/or chemically associated (e.g., adsorbed, bound through ion exchange, and/or precipitated) therewith.

The first solid-solid separation unit 104 may employ separation factors including, but not limited to, centripetal force, fluid resistance (drag), gravimetric forces, settling velocity, and mobile carrier characteristics such as size, shape, and density. Example first solid-solid separation units include, but are not limited to, those using screening, hydrocyclone separation, sedimentation, clarification, membrane filtration, cloth-disc type filtration, classification, and combinations of any two or more thereof. For example, the first solid-solid separation unit 104 may include hydrocyclones, lamella plate settlers, static screens, band screens, drum screens, sieves, spitzkasten (i.e., a series of cones that sequentially separate particles based on size), single-cone classifiers, double-cone classifiers, multiple-cone classifiers, concentric cones, elutriators (i.e., vertical columns), barbotage (i.e., bubbling) chambers, and/or flotation chambers. In some embodiments, the first solid-solid separation unit 104 includes two or more such devices, where the devices are the same or different (e.g., 4 hydrocyclones arranged in series, or a flotation chamber coupled with a barbotage chamber).

As the first effluent 118, of the first solid-solid separation unit 104, is substantially or wholly uncontaminated water, the first effluent 118 may be released from the system as treated water 122. As the first effluent 118 has a desired pH due to the addition of the solution 112, the first effluent 118 may be mixed with a solution 124, including one or more bases or one or more acids, to cause the treated water 122 to have a pH suitable for the treated effluent.

The system may include a pH meter 126 positioned to measure a pH of the first effluent 118 and send, to an automated dispenser (not illustrated) of the solution 124, a signal that, based on an algorithm (which may including a mathematical function(s) and/or empirical function(s) and/or fuzzy logic and/or a machine learning-based computation(s)), indicates an amount of the solution 124 to be dispensed based on the pH currently being measured by the pH meter 126. An application of several acids or bases may be used in sequence and/or as a mixture(s) to create the solution 124, and the masses of each in the solution 124 can vary. A PLC may be included with a pump that has a variable-speed motor. The PLC may be programmed to receive a signal from the pH meter 126 and run the pump until the signal reaches a desired value or tolerance.

In some embodiments, the automated dispenser may be configured to dispense a first solution 124a including one or more acids and a second solution 124b including one or more bases, and the automated dispenser may selectively dispense one of the first solution 124a and the second solution 124b based on the signal received from the pH meter 126, the algorithm, and the desired pH to be achieved for the treated water 122.

The present disclosure is not to be limited to utilization of any particular acid(s) or base(s) for purposes of the solution 124. By way of example and not limitation, when the solution 124 includes one or more acids, the solution 124 may include one or more of sulfuric acid ($H_2SO_4$), hydrochloric acid (HCl), nitric acid ($HNO_3$), phosphoric acid ($H_3PO_4$), and citric acid ($C_6H_8O_7$). Further, by way of example and not limitation, when the solution 124 includes one or more bases, the solution 124 may include one or more of sodium hydroxide (NaOH), calcium hydroxide ($Ca(OH)_2$), and sodium carbonate ($Na_2CO_3$).

In some embodiments, at least a portion of the first effluent 118, of the first solid-solid separation unit 104, is recirculated back to and input to the first reactor 102. By recirculating the at least a portion of the first effluent 118, a decreased amount of the solution 112 (i.e., acid(s) and/or base(s)) may be used as the at least a portion of the first effluent 118 is at the desired pH of the contaminated water 110 in the first reactor 102. In some embodiments, the at least a portion of the first effluent 118 may be input directly to the first reactor 102. In some embodiments, the at least a portion of the first effluent 118 may be combined with the contaminated water 110 prior to the contaminated water 110 being input to the first reactor 102. In some embodiments, the at least a portion of the first effluent 118 may be combined with the contaminated water 110 prior to the pH of the contaminated water 110 being measured by the pH meter 113 (i.e., may be combined with the contaminated water 110 upstream of the pH meter 113 with respect to fluid flow).

The second effluent 120, of the first solid-solid separation unit 104, may be input to the second reactor 106. In some embodiments, water may need to be added to the second effluent 120 to sufficiently fluidize the second effluent 120 for conveyance to the second reactor 106 and/or to remove the one or more mobile carriers 114 from the solid-solid separation unit. In such embodiments, it may be desirable to add the minimum amount of water needed.

In some embodiments, the second effluent 120 (or a portion thereof), of the first solid-solid separation unit 104, may be passed through an oxidation unit prior to being input to the second reactor 106. The oxidation unit may be configured to destroy residual organic compounds in the second effluent 120 (or a portion thereof) using one or more of ultraviolet oxidation, metal-catalyzed oxidation (e.g., Fenton's reagent), and chemical oxidation (e.g., using chloride).

The second reactor 106 may also take as influent a solution 130 including one or more bases and/or one or more brines (i.e., water strongly impregnated with salt) to cause the second effluent 120, of the first solid-solid separation unit 104, to have a desired pH for promoting disassociation (e.g., desorption, reversal of ion exchange binding, etc.) of the one or more contaminants from the one or more mobile carriers 114. In some embodiments, the solution 130 may include one or more bases and one or more brines, as a combination of pH and cation concentration may promote disassociation of the one or more contaminants from the one or more mobile carriers 114. In some embodiments, the desired pH may be neutral or basic. For example, the desired pH may be equal to or greater than 7, equal to or greater than 8, equal to or greater than 9, equal to or greater than 10, equal to or greater than 11, equal to or greater than 12, equal to or greater than 13, or equal to 14.

The system may include a pH meter 132 positioned to measure a pH of the second effluent 120, of the first solid-solid separation unit 104, and send, to an automated dispenser (not illustrated) of the solution 130, a signal that, based on an algorithm (which may including a mathematical function(s) and/or empirical function(s) and/or fuzzy logic and/or a machine learning-based computation(s)), indicates an amount of the solution 130 to be dispensed based on the pH currently being measured by the pH meter 132. Conceptually, several bases and/or brines may be used to create the solution 130, and the masses of each in the solution 130 can vary. A PLC may be included with a pump that has a variable-speed motor. The PLC may be programmed to receive a signal from the pH meter 132 and run the pump until the signal reaches a desired value or tolerance.

The pH meter 132 may be positioned upstream of the second reactor 106 with respect to fluid flow of the system, or the pH meter 132 may be positioned within the second reactor 106.

The present disclosure is not to be limited to utilization of any particular base(s) or brine(s) for purposes of the solution 30. By way of example and not limitation, when the solution 130 includes one or more bases, the solution 130 may include one or more of sodium hydroxide (NaOH), calcium hydroxide (Ca(OH)$_2$), and sodium carbonate (Na$_2$CO$_3$). Further, by way of example and not limitation, when the solution 130 includes one or more brines, the solution 130 may include metal(s) or other cation(s) such as, for example, chlorides (e.g., sodium chloride, magnesium chloride, potassium chloride, and calcium chloride) and/or sulfates (e.g., sodium sulfate, magnesium sulfate, potassium sulfate, and calcium sulfate).

The one or more mobile carriers 114 may occupy various volumes of the second reactor 106. In some embodiments, the one or more mobile carriers 114 may occupy up to 100%, 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 5100, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%1, 5%, 14%, 13%, 12%, 11%, 10%, 9%, 8%, 7%, 6%, 5%, 4%, 3%, 2%, or 1% of the volume of the second reactor 106. In some embodiments, the one or more mobile carriers 114 may occupy at least 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10% 9%, 8%, 7%, 6%, 5%, 4%, 3%, 2%, or 1% of the volume of the second reactor 106. In some embodiments, the one or more mobile carriers 114 may be occupy between 1% and 100% of the volume of the second reactor 106. However, the present disclosure envisions the one or more mobile carriers 114 occupying any range of percentages of the volume of the second reactor 106, where the lower limit of the range is at least 1% and the upper limit of the range is at most 100%.

The one or more mobile carriers 114 may be various amounts of total suspended solids in the second reactor 106. In some embodiments, the one or more mobile carriers 114 may be 1% and 100% of the total suspended solids in the second reactor 106. However, the present disclosure envisions the one or more mobile carriers 114 being any range of percentages of the total suspended solids in the second reactor 106, where the lower limit of the range is at least 1% and the upper limit of the range is at most 100%.

In some embodiments, the second effluent 120, of the first solid-solid separation unit 104, may be combined with the solution 130, including one or more bases and/or one or more brines, prior to the second effluent 120 and the solution 130 being input to the second reactor 106.

In some embodiments, the second effluent 120, of the first solid-solid separation unit 104, and the solution 130, including one or more bases and/or one or more brines, may be separately input to the second reactor 106.

The second reactor 106 is not meant to be limited to any particular structural configuration. Rather, the second reactor 106 is intended to be any structural configuration capable of agitating the second effluent 120, including the one or more mobile carriers 114 having the one or more contaminants physically and/or chemically associated with (e.g., adsorbed, bound through ion exchange, and/or precipitated) therewith, and facilitating disassociation (e.g., desorption, reversal of ion exchange binding, etc.) of the one or more contaminants from the one or more mobile carriers 114. For example and not limitation, the second reactor 106 may be a concrete or steel tank.

In some embodiments, the second reactor 106 may be partitioned. With respect to the second reactor 106, "partition" and "partitioned" means the second reactor 106 is separated into two or more zones. In some embodiments, zones are physically separated, for example, by one or more partitions, or walls. Partitions include weir walls, submerged weir walls, curtains, or other physical separation devices. In some embodiments, one or more partitions are positioned parallel to the direction of flow of fluid in the second reactor 106, thereby creating multiple second reactors in parallel. In other embodiments, one or more partitions are positioned perpendicular to the direction of flow of the fluid in the second reactor 106, thereby creating multiple second reactors in series.

In some embodiments, the second reactor 106 may have a hydraulic retention time of 0.1 to 100 hours. However, the present disclosure envisions the second reactor 106 having any hydraulic retention time range, where the lower limit of the range is at least 0.1 hours and the upper limit of the range is at most 100 hours.

In some embodiments, the second reactor 106 may be mixed to have a velocity gradient of 1 to 1,000,000/s. However, the present disclosure envisions the second reactor 106 being mixed to have a velocity gradient within any range where the lower limit of the range is at least 1/s and the upper limit of the range is at most 1,000,000/s. The second reactor 106 can be mixed by a variety of means including, but not limited to, mechanical mixing, jet mixing, air mixing, and a combination of any two or more thereof.

The second reactor 106 outputs a second reactor effluent 134 having the desired pH noted herein above and including the one or more contaminants separated from (i.e., physically and chemically disassociated from) the one or more mobile carriers 114.

In the example of FIG. 1, the second reactor effluent 134 is input to the second solid-solid separation unit 108. The second solid-solid separation unit 108 may be any device configured to perform one or more solid-solid separation processes that substantially or completely separates the second reactor effluent 134 into a first effluent 136 and a second effluent 138. The first effluent 136 includes the one or more mobile carriers 114, and substantially or entirely none of the one or more contaminants. The second effluent 138 has the desired pH, due to water being needed to convey the second reactor effluent 134 from the second reactor 106 and to the second solid-solid separation unit 108, and includes the one or more contaminants, and substantially or entirely none of the one or more mobile carriers 114.

The second solid-solid separation unit 108 may employ separation factors including, but not limited to, centripetal force, fluid resistance (drag), settling velocity, and particle characteristics such as size, shape, and density. Example second solid-solid separation units include, but are not limited to, those using screening, hydrocyclone separation, sedimentation, clarification, membrane filtration, cloth-disc type filtration, classification, and combinations of any two or more thereof. For example, the second solid-solid separation unit 108 may include hydrocyclones, lamella plate settlers, static screens, band screens, drum screens, sieves, spitzkasten (i.e., a series of cones that sequentially separate particles based on size), single-cone classifiers, double-cone classifiers, multiple-cone classifiers, concentric cones, elutriators (i.e., vertical columns), barbotage (i.e., bubbling) chambers, and/or flotation chambers. In some embodiments, the first solid-solid separation unit 104 includes two or more such devices, where the devices are the same or different (e.g., 4 hydrocyclones arranged in series, or a flotation chamber coupled with a barbotage chamber).

The first effluent 136, of the second solid-solid separation unit 108, may be recirculated to back to and input to the first reactor 102. Thus, it will be appreciated that the one or more mobile carriers 114 are reusable by a system of the present disclosure. In some embodiments, the first effluent 136, of the second solid-solid separation unit 108, may be input directly to the first reactor 102. In some embodiments, the first effluent 136, of the second solid-solid separation unit 108, may be combined with the contaminated water 110 prior to the contaminated water 110 being input to the first reactor 102. In some embodiments, the first effluent 136, of the second solid-solid separation unit 108, may be combined with the contaminated water 110 prior to the pH of the contaminated water 110 being measured by the pH meter 113 (i.e., may be combined with the contaminated water 110 upstream of the pH meter 113 with respect to fluid flow).

The second effluent 138, of the second solid-solid separation unit 108, may be released from the system and utilized in, for example, the production of fertilizers and animal feed supplements.

In some embodiments, at least a portion of the second effluent 138, of the second solid-solid separation unit 108, is recirculated back to and input to the second reactor 106. By recirculating the at least a portion of the second effluent 138, a decreased amount of the solution 130 may be used as the at least a portion of the second effluent 138, is at the desired pH fluid is to have in and when exiting the second reactor 106. Moreover, in situations where the second effluent 138 includes cations due to the solution 130 including one or more brines, recirculating the at least a portion of the second effluent 138 allows for a particular contaminant, or contaminants (e.g., phosphate and/or ammonium), concentration to be maintained, thereby maximizing precipitation of a particular contaminant, or contaminants (e.g., phosphate and/or ammonium), in the second reactor 106. In some embodiments, the at least a portion of the second effluent 138 may be input directly to the second reactor 106. In some embodiments, the at least a portion of the second effluent 138 may be combined with the second effluent 120, of the first solid-solid separation unit 104, prior to the second effluent 120 being input to the second reactor 106. In some embodiments, the at least a portion of the second effluent 138 may be combined with the second effluent 120, of the first solid-solid separation unit 104, prior to the pH of the second effluent 120 being measured by the pH meter 132 (i.e., may be combined with the second effluent 120 upstream of the pH meter 132 with respect to fluid flow).

Figure 2:
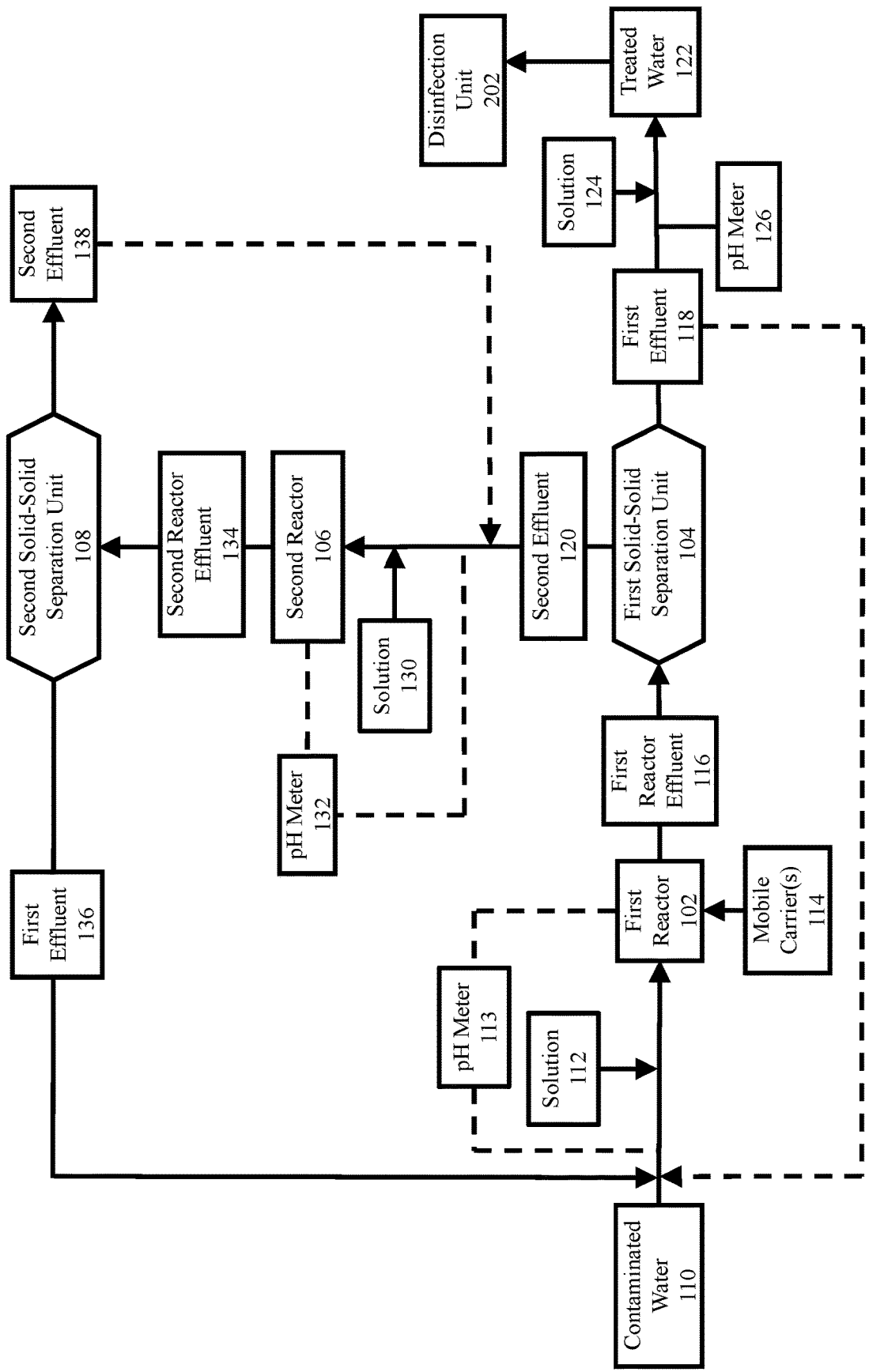
FIG. 2 is a schematic drawing of the system configuration of FIG. 1 further including a disinfection unit in fluidic communication with a first solid-solid separation unit.

With reference to FIG. 2, the system of the present disclosure may include a disinfection unit 202 in fluidic communication with the first solid-solid separation unit 104. The disinfection unit 202 receives the treated water 122 and may destroy residual organic compounds in the treated water 122 using one or more of ultraviolet oxidation, metal-catalyzed oxidation, and chemical oxidation. The disinfection unit 202 may be a concrete or steel structure, and may have an open surface or may be enclosed.

Figure 3:
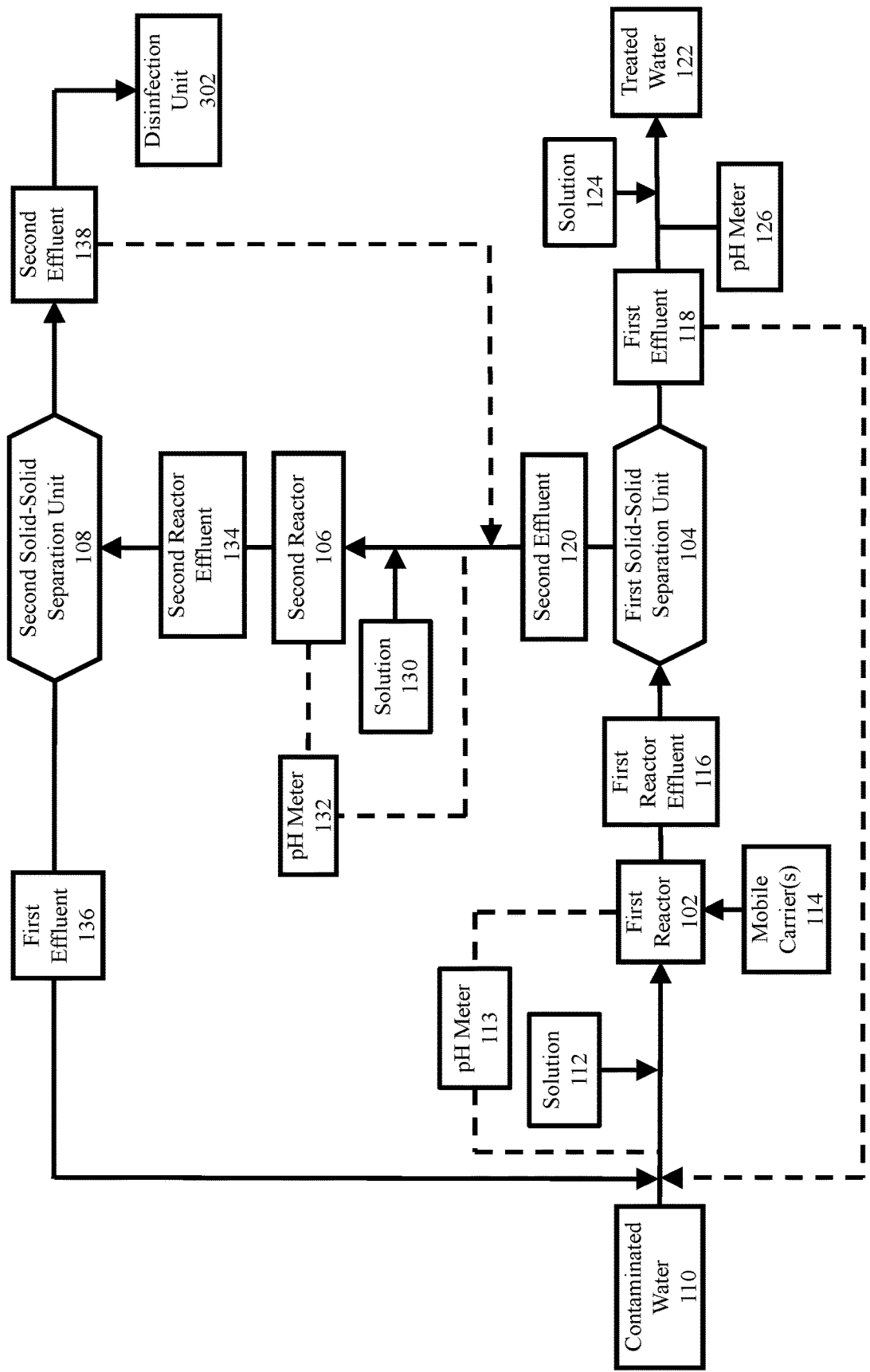
FIG. 3 is a schematic drawing of the system configuration of FIG. 1 further including a disinfection unit in fluidic communication with a second solid-solid separation unit.

With reference to FIG. 3, the system of the present disclosure may include a disinfection unit 302 in fluidic communication with the second solid-solid separation unit 108. The disinfection unit 202 receives at least a portion of the second effluent of the second solid-solid separation unit 108 (i.e., the second effluent 138) including the one or more contaminants, and substantially or entirely none of the one or more mobile carriers 114. The disinfection unit 302 may destroy residual organic compounds in the at least a portion of the second effluent of the second solid-solid separation unit 108 (i.e., the second effluent 138) using one or more of ultraviolet oxidation, metal-catalyzed oxidation, and chemical oxidation. The disinfection unit 302 may be a concrete or steel structure, and may have an open surface or may be enclosed.

Figure 4:
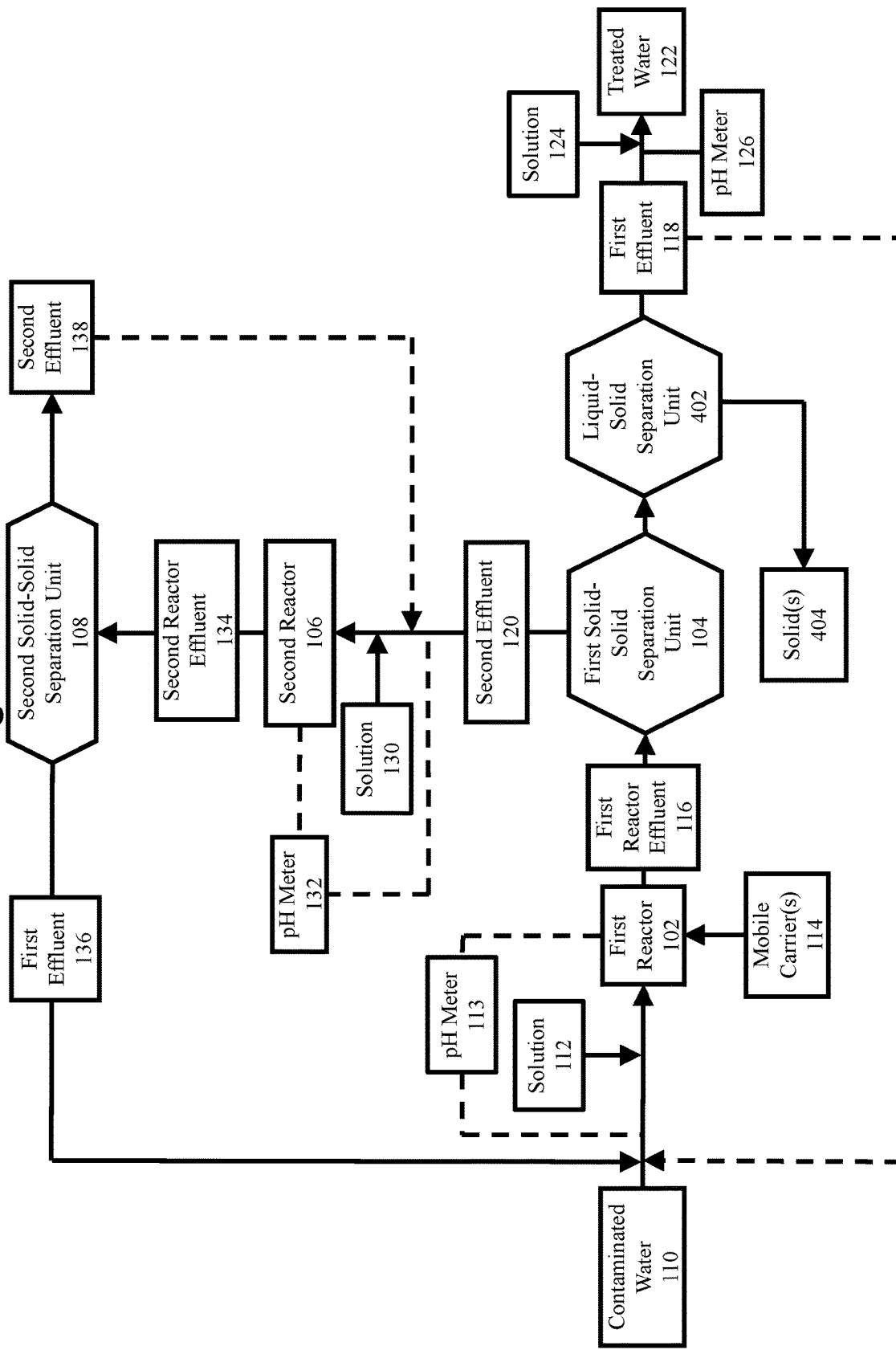
FIG. 4 is a schematic drawing of the system configuration of FIG. 1 further including a liquid-solid separation unit in fluidic communication with the first solid-solid separation unit.

Referring to FIG. 4, the system of the present disclosure may include a liquid-solid separation unit 402 in fluidic communication with the first solid-solid separation unit 104. The liquid-solid separation unit 402 is positioned to receive the first effluent 118 of the first solid-solid separation unit 104. The liquid-solid separation unit 402 may be any device capable of performing a liquid-solid separation process that substantially separates undissolved, or suspended, solid(s) 404 (e.g., one or more mixtures of metals (e.g., Al, Ca, K, Mg, Na, Mn, Fe, Cu) and ions (e.g., ions of Cl, $SO_4$, $CO_3$, $HCO_3$, O, OH, $(OH)_2$, $(OH)_3$, $(OH)_4$, $NH_3$, $(NH_3)_2$, $PO_4$, $(PO_4)_2$, $HPO_3$, $HPO_4$, $H_2PO_4$, HS, and S) and/or a combination thereof) from the water in the first effluent 118 of the first solid-solid separation unit 104. Such devices include, but are not limited to, membrane filtration units, clarification (or sedimentation) tanks units, granular media filtration units, dissolved air flotation units, ballasted flocculation clarification (or sedimentation) units, centrifuges, and the like. In some instances, the solid(s) 404 may be referred to as "sludge." In some embodiments, the solid(s) 404 may be an underflow of the liquid-solid separation unit 402.

In embodiments where the system includes the liquid-solid separation unit 402, the solution 124 may be added to at least a portion of the treated effluent (illustrated as the first effluent 118 in FIG. 4) of the liquid-solid separation unit 402.

Figure 5:
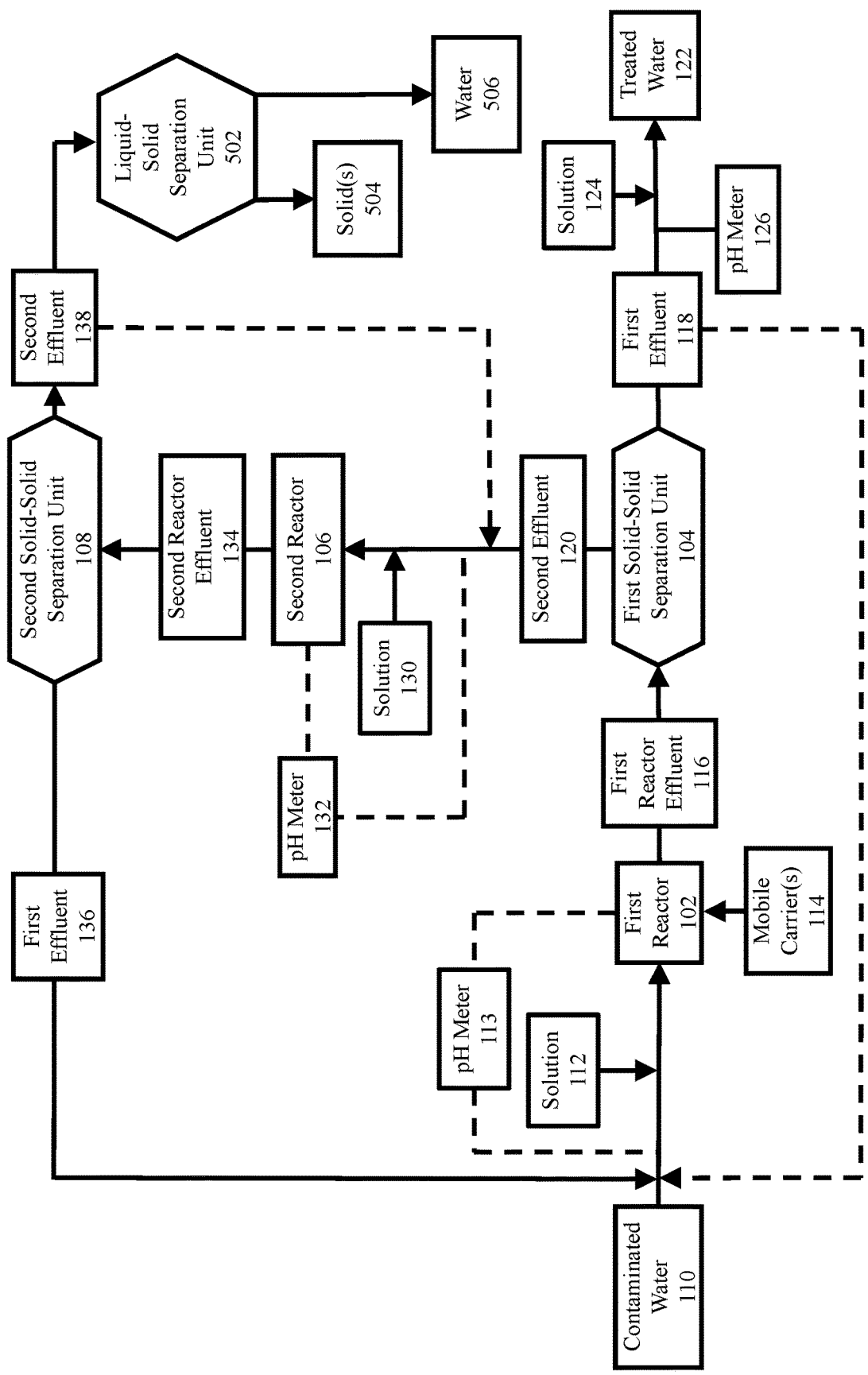
FIG. 5 is a schematic drawing of the system configuration of FIG. 1 further including a liquid-solid separation unit in fluidic communication with the second solid-solid separation unit.

Referring to FIG. 5, the system of the present disclosure may include a liquid-solid separation unit 502 in fluidic communication with the second solid-solid separation unit 108. The liquid-solid separation unit 502 is positioned to receive at least a portion or all of the second effluent 138 of the second solid-solid separation unit 108 (i.e., depending on whether a portion of the second effluent 138 is recirculated back to the second reactor 106). The liquid-solid separation unit 502 may be any device capable of performing a liquid-solid separation process that substantially separates undissolved, or suspended, solid(s) 504 (i.e., the one or more contaminants that may be used, for example, in fertilizers and other usable compositions) from the water 506 in the second effluent 138 of the second solid-solid separation unit 108. Such devices include, but are not limited to, membrane filtration units, clarification (or sedimentation) tanks units, granular media filtration units, dissolved air flotation units, ballasted flocculation clarification (or sedimentation) units, centrifuges, and the like. In some embodiments, the solid(s) 504 may be an underflow of the liquid-solid separation unit 502.

In some embodiments, the system of the present disclosure may include a concentrator unit in fluidic communication with the second solid-solid separation unit 108. The concentrator unit is positioned to receive at least a portion or all of the second effluent 138 of the second solid-solid separation unit 108 (i.e., depending on whether a portion of the second effluent 138 is recirculated back to the second reactor 106), and may substantially separate undissolved, or suspended, solid(s) 504 (i.e., the one or more contaminants that may be used, for example, in fertilizers and other human-usable compositions) from the water 506 in the second effluent 138 of the second solid-solid separation unit 108.

The concentrator unit may be a fiber reinforced plastic (FRP), concrete, or steel tank, or may be made from one or more plastic materials (e.g., PVC, CPVC, HDPE, cross-linked HDPE, or LDPE) and include a mechanism that scrapes concentrated and compacted solids from its bottom. The concentrator unit may include weirs, and launders to capture overflow from the weirs. The concentrator unit may have an energy-dissipating inlet, an air-sparging system, a backwashing system, a surface-scraping unit, and/or a gas-injection system. In some embodiments, the concentrator unit may use hydrodynamic effects, which is water pressure and flow, or a combination thereof, with or without compressed air.

Figure 6:
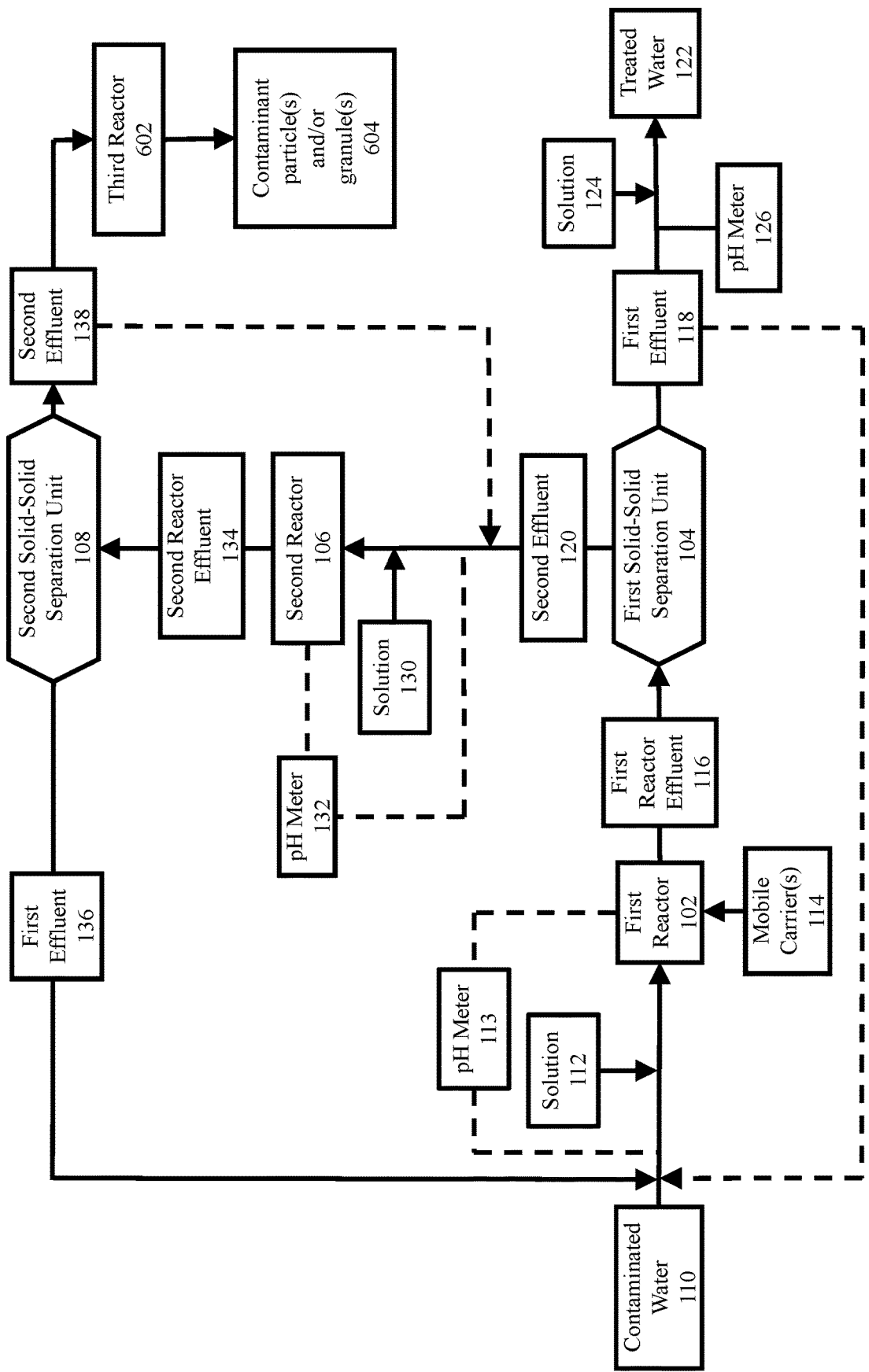
FIG. 6 is a schematic drawing of the system configuration of FIG. 1 further including a third reactor in fluidic communication with the second solid-solid separation unit.

With reference to FIG. 6, the system of the present disclosure may include a third reactor 602 in fluidic communication with the second solid-solid separation unit 108. The third reactor 602 is positioned to receive at least a portion or all of the second effluent 138 of the second solid-solid separation unit 108 (i.e., depending on whether a portion of the second effluent 138 is recirculated back to the second reactor 106).

In embodiments, the third reactor 602 is configured to precipitate and/or granulate the one or more contaminants in the second effluent 138, thereby producing treated water including the one or more contaminant particles and/or granules 604 and/or end products that can be granular, precipitates, gel-like, floc, or a combination thereof. In some embodiments, precipitation and/or granulation of the one or more contaminant particles and/or granules 604 may be a function of the third reactor 602 receiving a solution including one or more alkaline earth metal salts, one or more acids, one or more bases, and/or one or more other material, element, or compound useable to precipitate and/or granulate a desirable end product. However, it is noted that alkaline earth metal salts, that may cause a chemical sludge that is toxic or not useful as a beneficial product, should be excluded or applied in a controlled manner. For example, magnesium may be added to a solution with ammonium and phosphate to form struvite, and phosphates can be added as a seed for growing phosphate gels/crystals/precipitates.

The present disclosure is not to be limited to controlled dosing and utilization of any particular alkaline earth metal salt(s), acid(s), and/or base(s) for purposes of the aforementioned solution. By way of example and not limitation, when the solution includes one or more acids, the solution 112 may include one or more calcium salts, one or more magnesium salts, one or more potassium salts, one or more aluminum salts, one or more iron salts, one or more copper salts, or a combination of any two or more thereof. By way of example and not limitation, when the solution includes one or more acids, the solution 112 may include one or more of sulfuric acid ($H_2SO_4$), hydrochloric acid (HCl), nitric acid ($HNO_3$), phosphoric acid ($H_3PO_4$), and citric acid ($C_6H_8O_7$). Further, by way of example and not limitation, when the solution includes one or more bases, the solution may include one or more of sodium hydroxide (NaOH), calcium hydroxide ($Ca(OH)_2$), and sodium carbonate ($Na_2CO_3$).

The third reactor 602 may be any device configured to provide the second effluent 138 with sufficient time for precipitation and/or granulation of the one or more contaminants to occur. Such devices include, but are not limited to, concrete and steel tanks. In some embodiments, the third reactor 602 may be a stretch of (serpentine) pipe.

In some embodiments, the third reactor 602 may be configured to facilitate production of a concentrated liquid. For example, the concentrated liquid may include one or more mixtures of phosphates, such as orthophosphate and di- and tri-phosphates, and/or ammonium salt mixtures.

Figure 7:
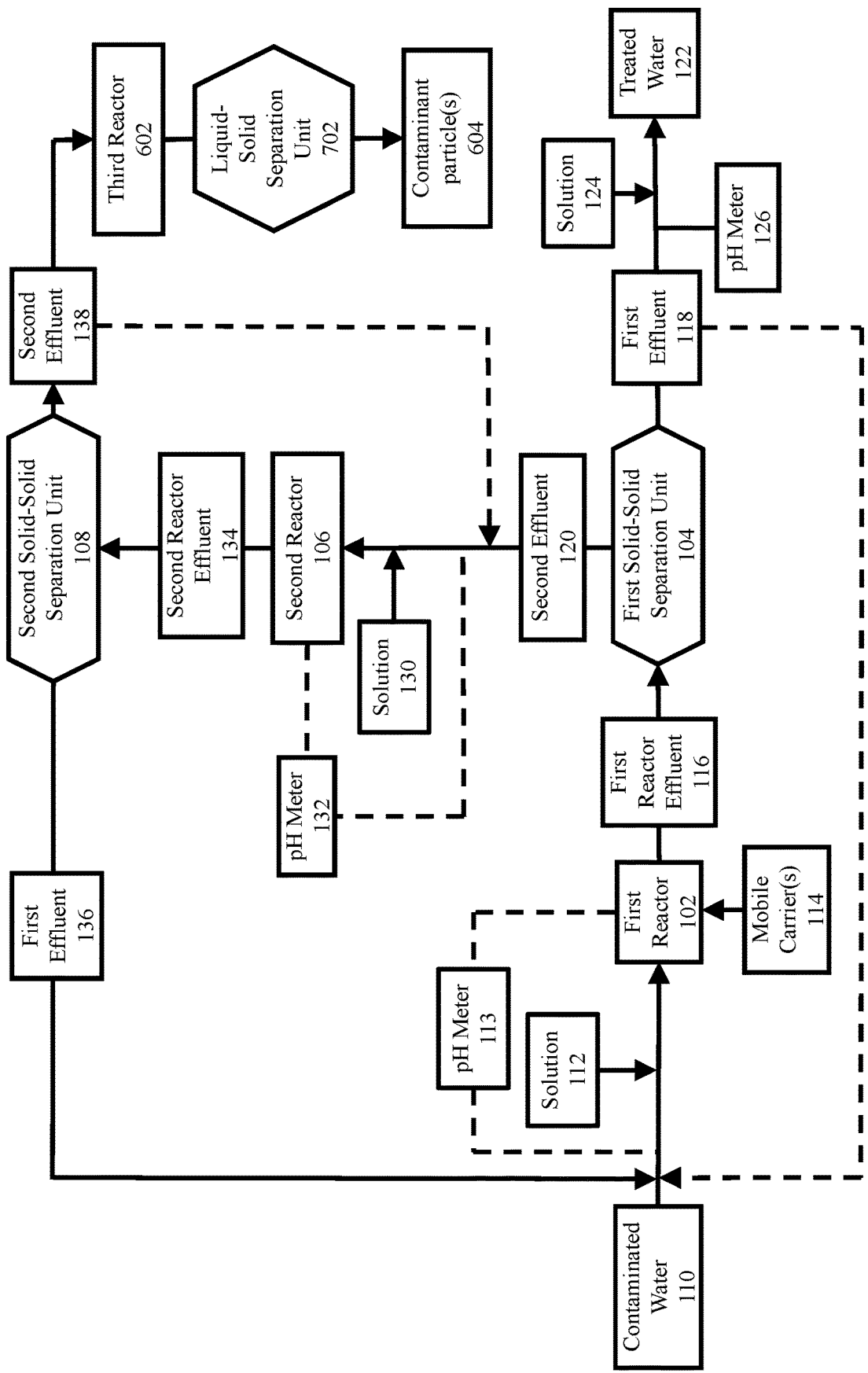
FIG. 7 is a schematic drawing of the system configuration of FIG. 6 further including a liquid-solid separation unit in fluidic communication with the third reactor.

As illustrated in FIG. 7, the system of the present disclosure may include a liquid-solid separation unit 702 in fluidic communication with the third reactor 602. The liquid-solid separation unit 702 is positioned to receive the effluent of the third reactor 602 (i.e., treated water including precipitated and/or granulated one or more contaminant particles and/or granules 604). The liquid-solid separation unit 702 may be any device capable of performing a liquid-solid separation process that substantially separates undissolved, or suspended, one or more contaminant particles and/or granules 604 from the fluid component (i.e., treated water) in the effluent of the third reactor 602. Such devices include, but are not limited to, membrane filtration units, clarification (or sedimentation) tanks units, granular media filtration units, dissolved air flotation units, ballasted flocculation clarification (or sedimentation) units, centrifuges, and the like. In some embodiments, the one or more contaminant particles and/or granules 604 may be an underflow of the liquid-solid separation unit 702.

In some embodiments, the system of the present disclosure may include a concentrator unit in fluidic communication with the third reactor 602. The concentrator unit may be positioned to receive the effluent of the third reactor 602 (i.e., treated water including precipitated and/or granulated one or more contaminant particles and/or granules 604), and substantially separate undissolved, or suspended, one or more contaminant particles and/or granules 604 from the fluid component (i.e., treated water) in the effluent of the third reactor 602.

The concentrator unit may be a fiber reinforced plastic (FRP), concrete, or steel tank, or may be made from one or more plastic materials (e.g., PVC, CPVC, HDPE, cross-linked HDPE, or LDPE) and include a mechanism that scrapes concentrated and compacted solids from its bottom. The concentrator unit may include weirs, and launders to capture overflow from the weirs. The concentrator unit may have an energy-dissipating inlet, an air-sparging system, a backwashing system, a surface-scraping unit, and/or a gas-injection system. In some embodiments, the concentrator unit may use hydrodynamic effects, which is water pressure and flow, or a combination thereof, with or without compressed air.

Figure 8:
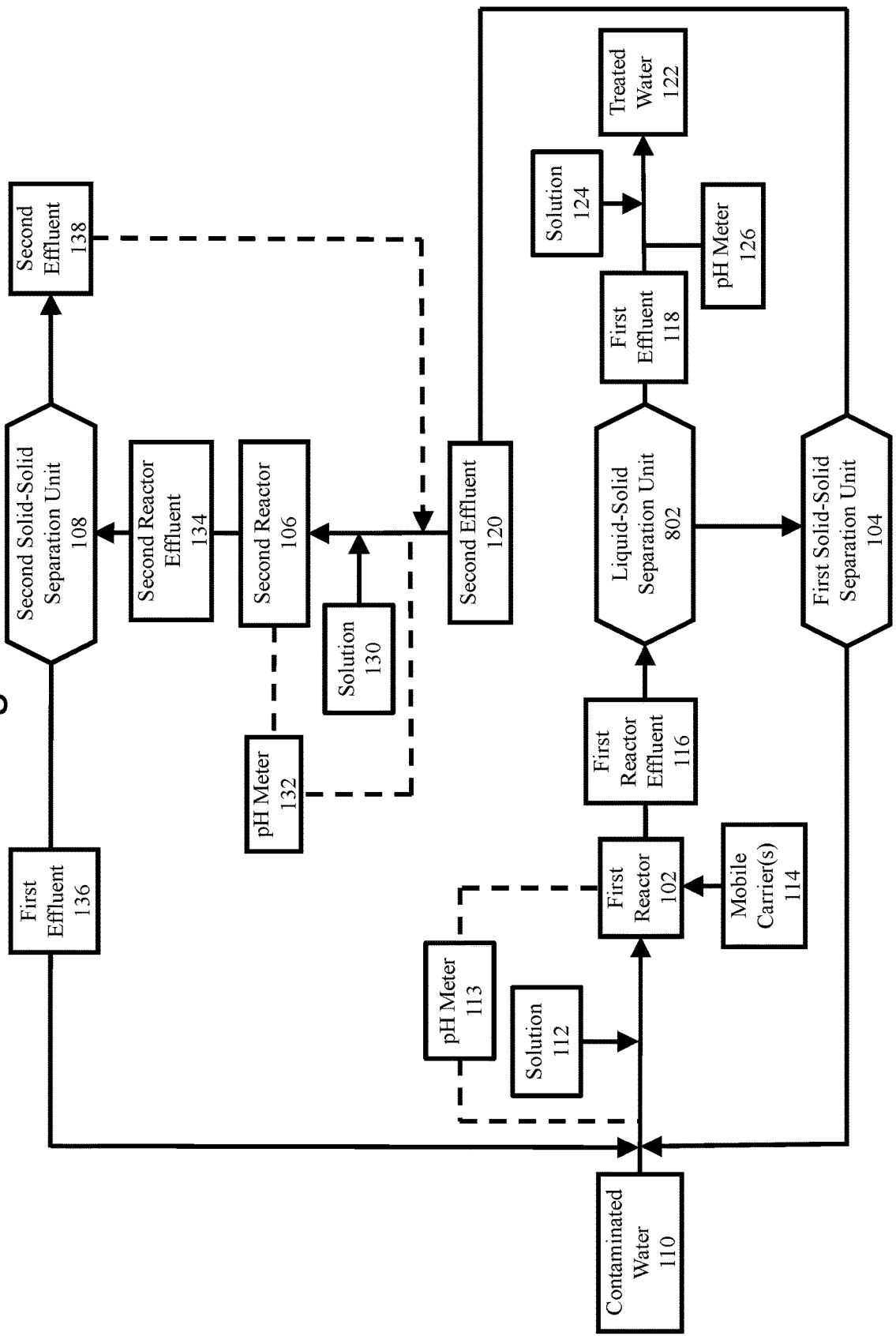
FIG. 8 is a schematic drawing of the system configuration of FIG. 1 further including a liquid-solid separation unit in fluidic communication with and positioned between a first reactor and the first solid-solid separation unit.

Referring to FIG. 8, the system of the present disclosure may include a liquid-solid separation unit 802 in fluidic communication with and positioned between the first reactor 102 and the first solid-solid separation unit 104. In the example of FIG. 8, the liquid-solid separation unit 802 receives the first reactor effluent 116, and may be any device capable of performing a liquid-solid separation process that substantially separates undissolved, or suspended, solid(s) from fluid in the first reactor effluent. In other words, the liquid-solid separation unit 802 may output the first effluent 118 including water having the desired pH, where the first effluent is substantially free of the one or more mobile carriers 114 and the one or more contaminants, and a second effluent having the desired pH and including the one or more mobile carriers 114 physically and/or chemically associate with the one or more contaminants. Example liquid-solid separation units include, but are not limited to, membrane filtration units, clarification (or sedimentation) tanks units, granular media filtration units, dissolved air flotation units, ballasted flocculation clarification (or sedimentation) units, centrifuges, and the like. In some embodiments, the second effluent may be an underflow of the liquid-solid separation unit 802.

The second effluent, of the liquid-solid separation unit 802, is input to the first solid-solid separation unit 104 in the example of FIG. 8. The first solid-solid separation unit 104 may process as described herein above to separate the one or more mobile carriers 114 physically and/or chemically associated with the one or more contaminants from water in the second effluent of the liquid-solid separation unit. The water, output by the first solid-solid separation unit 104, may be recirculated back to and input to the first reactor 102. By recirculating the water, a decreased amount of the solution 112 may be used as the water is at the desired pH the contaminated water 110 is to have in the first reactor 102. In some embodiments, the water may be input directly to the first reactor 102. In some embodiments, the water may be combined with the contaminated water 110 prior to the contaminated water 110 being input to the first reactor 102. In some embodiments, the water may be combined with the contaminated water 110 prior to the pH of the contaminated water 110 being measured by the pH meter 113 (i.e., may be combined with the contaminated water 110 upstream of the pH meter 113 with respect to fluid flow).

The first solid-solid separation unit 104 also outputs the second effluent 120 described herein above, which may be input to the second reactor 106 as described herein above.

In some embodiments, the system of the present disclosure may include a concentrator unit in place of the liquid-solid separation unit 802.

The concentrator unit may be a fiber reinforced plastic (FRP), concrete, or steel tank, or may be made from one or more plastic materials (e.g., PVC, CPVC, HDPE, cross-linked HDPE, or LDPE) and include a mechanism that scrapes concentrated and compacted solids from its bottom. The concentrator unit may include weirs, and launders to capture overflow from the weirs. The concentrator unit may have an energy-dissipating inlet, an air-sparging system, a backwashing system, a surface-scraping unit, and/or a gas-injection system. In some embodiments, the concentrator unit may use hydrodynamic effects, which is water pressure and flow, or a combination thereof, with or without compressed air.

The system of the present disclosure is highly configurable to drive generation of desired products (e.g., treated water and recovered materials to be used, for example, as fertilizers). Different chemicals may be added in one or more recirculation loops. The amount of end products may be controlled by adjusting a recirculation and retention time ratio, and the amount and type(s) of materials added.

EQUIVALENTS

Although several aspects of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific aspects of the disclosure described herein. It is, therefore, to be understood that the foregoing aspects are presented by way of example only and that, within the scope of the appended claims and equivalents thereto; the disclosure may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated by reference in their entirety herein.

As used herein, the term "about" modifying, for example, concentration, volume, process time, yield, flow rate, pressure, and like values, and ranges thereof, employed in describing the embodiments of the present disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods; and like proximate considerations. The term "about" also encompasses amounts that differ due to aging of a material with a particular initial concentration or mixture, and amounts that differ due to mixing or processing a material with a particular initial concentration or mixture. Where modified by the term "about," the claims that follow include equivalents to these quantities.

As used herein, the word "substantially" modifying, for example, a property, a measurable quantity, a method, a position, a value, or a range, employed in describing the embodiments of the present disclosure, refers to a variation that does not affect the overall recited property, quantity, method, position, value, or range thereof in a manner that negates an intended property, quantity, method, position, value, or range. Where modified by the term "substantially," the claims that follow include equivalents to these quantities, methods, positions, values, or ranges.

What is claimed is:

1. A system for removing and recovering one or more contaminants from water, the system comprising:
   one or more mobile carriers each comprising a core coated with a porous and non-reactive binding agent comprising one or more types of nanoparticles configured to become at least one of physically and chemically associated with the one or more contaminants;
   a first reactor configured to:
   receive contaminated water comprising the one or more contaminants, wherein at least a portion of the one or more contaminants have net charges,
   receive a solution comprising one or more acids or one or more bases configured to cause the contaminated water to have a first desired target pH,
   receive the one or more mobile carriers, and
   output a first reactor effluent comprising water, having the first desired pH, and the one or more mobile carriers being at least one of physically and chemically associated with the one or more contaminants;
   a first solid-solid separation unit configured to separate the first reactor effluent into a first effluent and a second effluent, wherein:
   the first effluent, of the first solid-solid separation unit, comprises water having the first desired pH, and is at least substantially free of the one or more mobile carriers and the one or more contaminants, and
   the second effluent, of the first solid-solid separation unit, has the first desired pH and comprises the one or more mobile carriers being at least one of physically and chemically associated with the one or more contaminants;
   a second reactor in fluidic communication with the first solid-solid separation unit, the second reactor configured to:
   receive the second effluent of the first solid-solid separation unit,
   receive a solution comprising at least one of one or more bases and one or more brines configured to cause the second effluent, of the first solid-solid separation unit, to have a second desired pH, and
   output a second reactor effluent having the second desired pH and comprising the one or more contaminants separated from the one or more mobile carriers; and
   a second solid-solid separation unit configured to separate the second reactor effluent into first and second effluents of the second solid-solid separation unit, wherein:
   the first effluent, of the second solid-solid separation unit, comprises the one or more mobile carriers, and
   the second effluent, of the second solid-solid separation unit, has the second desired pH and comprises the one or more contaminants.

2. The system of claim 1, wherein the one or more contaminants comprise one or more phosphates, one or more ammonium salts, or a combination of any two or more thereof.

3. The system of claim 2, wherein the one or more phosphates comprise one or more of orthophosphate, di-phosphate, and tri-phosphate.

4. The system of claim 1, wherein the contaminated water is combined with the solution comprising one or more acids or one or more bases and the one or more mobile carriers prior to being input to the first reactor.

5. The system of claim 1, wherein the first reactor is configured to mix the contaminated water, the solution comprising one or more acids or one or more bases, and the one or more mobile carriers to facilitate surface-based reactions between the one or more mobile carriers and the one or more contaminants.

6. The system of claim 1, wherein at least a portion of the first effluent, of the first solid-solid separation unit, is input to the first reactor.

7. The system of claim 1, wherein at least a portion of the first effluent, of the first solid-solid separation unit, is combined with the contaminated water prior to being input to the first reactor.

8. The system of claim 1, wherein a solution comprising one or more bases or one or more acids is added to at least a portion of the first effluent, of the first solid-solid separation unit, to produce treated water.

9. The system of claim 8, further comprising a disinfection unit configured to receive the treated water, wherein the disinfection unit is configured to destroy residual organic compounds in the treated water.

10. The system of claim 1, further comprising a liquid-solid separation unit configured to receive the first effluent, of the first solid-solid separation unit, and separate one or more solids from water in the first effluent of the first solid-solid separation unit,
wherein the solution comprising one or more bases or one or more acids is added to the water output from the liquid-solid separation unit.

11. The system of claim 1, wherein the second reactor is configured to agitate the second effluent, of the first solid-solid separation unit, and the solution comprising at least one of one or more bases and one or more bases to cause the one or more contaminants to separate from the one or more mobile carriers.

12. The system of claim 1, wherein at least a portion of the second effluent, of the second solid-solid separation unit, is input to the second reactor.

13. The system of claim 1, wherein at least a portion of the second effluent, of the second solid-solid separation unit, is combined with the second effluent, of the first solid-solid separation unit, prior to being input to the second reactor.

14. The system of claim 1, wherein the solution comprising at least one of one or more bases and one or more brines is combined with the second effluent, of the first solid-solid separation unit, prior to being input to the second reactor.

15. The system of claim 1, wherein the first effluent, of the second solid-solid separation unit, is input to the first reactor.

16. The system of claim 1, wherein the first effluent, of the second solid-solid separation unit, is combined with the contaminated water prior to being input to the first reactor.

17. The system of claim 1, wherein the first solid-solid separation unit is configured to use screening, hydrocyclone separation, sedimentation, clarification, membrane filtration, and cloth-disc type filtration, or a combination of any two or more thereof.

18. The system of claim 1, wherein the second solid-solid separation unit is configured to use screening, hydrocyclone separation, sedimentation, clarification, membrane filtration, classification, and cloth-disc type filtration, or a combination of any two or more thereof.

19. The system of claim 1, wherein the one or more mobile carriers occupy up to 100% of a volume of the first reactor.

20. The system of claim 1, wherein the one or more mobile carriers occupy up to 100% of a volume of the second reactor.

21. The system of claim 1, wherein the one or more mobile carriers are 1% to 100% of total suspended solids in the first reactor.

22. The system of claim 1, wherein the one or more mobile carriers are 1% to 100% of total suspended solids in the second reactor.

23. The system of claim 1, wherein the first reactor is partitioned to perform two or more processes in series.

24. The system of claim 1, wherein the first reactor is partitioned to perform two or more processes in parallel.

25. The system of claim 1, wherein the first reactor has a hydraulic retention time of 0.1 to 100 hours.

26. The system of claim 1, wherein the first reactor is mixed to have a velocity gradient of 1 to 1,000,000/s.

27. The system of claim 1, wherein the second reactor is partitioned to perform two more processes in series.

28. The system of claim 1, wherein the second reactor is partitioned to perform two more processes in parallel.

29. The system of claim 1, wherein the second reactor has a hydraulic retention time of 0.1 to 100 hours.

30. The system of claim 1, further comprising a disinfection unit configured to receive at least a portion of the second effluent of the second solid-solid separation unit, wherein the disinfection unit is configured to destroy residual organic compounds in the at least a portion of the second effluent of the second solid-solid separation unit.

31. The system of claim 1, further comprising a oxidation unit configured to receive at least a portion of the second effluent of the first solid-solid separation unit.

32. The system of claim 1, further comprising a liquid-solid separation unit configured to receive the second effluent, of the second solid-solid separation unit, and separate the one or more contaminants from water in the second effluent of the second solid-solid separation unit.

33. The system of claim 1, further comprising a concentrator unit configured to receive the second effluent, of the second solid-solid separation unit.

34. The system of claim 1, further comprising a third reactor in fluidic communication with the second solid-solid separation unit, the third reactor configured to:
receive the second effluent of the second solid-solid separation unit,
receive a solution comprising at least one of one or more alkaline earth metal salts, one or more acids, and one or more bases, and
output a treated water comprising one or more contaminant particles.

35. The system of claim 34, wherein the one or more alkaline earth metal salts comprise one or more calcium salts, one or more magnesium salts, one or more potassium salts, one or more aluminum salts, one or more iron salts, one or more copper salts, or a combination of any two or more thereof.

36. The system of claim 34, further comprising a liquid-solid separation unit configured to separate the treated water from the one or more contaminant particles.

37. The system of claim 34, further comprising a concentrator unit configured to separate the treated water from the one or more contaminant particles.

38. The system of claim 1, further comprising at least one of a liquid-solid separation unit and a concentrator unit disposed in fluidic communication between the first reactor and the first solid-solid separation unit, wherein:
the at least one of the liquid-solid separation unit and the concentrator unit outputs a first effluent comprising water having the first desired pH, the first effluent being at least substantially free of the one or more mobile carriers and the one or more contaminants,
the at least one of the liquid-solid separation unit and the concentrator unit outputs a second effluent having the first desired pH and comprising the one or more mobile carriers having the one or more contaminants, and
the second effluent, of the liquid-solid separation unit is input to the first solid-solid separation unit.

39. The system of claim 1, wherein the first desired pH is equal to or less than 8.

40. The system of claim 1, wherein the second desired pH is equal to or greater than 7.

41. The system of claim 1, wherein the one or more mobile carriers comprise a first mobile carrier comprising a core coated with a porous and non-reactive binding agent comprising one or more types of nanoparticles, wherein at least one of:
the first mobile carrier has a density of 0.01 to 20 g/cm$^3$,
the first mobile carrier has a dimension of 1 to 12,500 microns, and the porous and non-reactive binding agent has a thickness of 0.001 to 1,000 microns.

42. The system of claim 41, wherein a shape of the first mobile carrier is formed through one or more physical processes, one or more chemical processes, one or more physical-chemical processes, or a combination of any two or more thereof.

43. The system of claim 41, wherein the first mobile carrier has a naturally occurring shape.

44. The system of claim 41, wherein a size of the first mobile carrier is formed through one or more physical processes, one or more chemical processes, one or more physical-chemical processes, or a combination of any two or more thereof.

45. The system of claim 41, wherein a porosity of the first mobile carrier is formed through one or more physical processes, one or more chemical processes, one or more physical-chemical processes, or a combination of any two or more thereof.

46. The system of claim 41, wherein the first mobile carrier has a net negative charge.

47. The system of claim 41, wherein the first mobile carrier has a net positive charge.

48. The system of claim 41, wherein the core is formed through one or more physical processes, one or more chemical processes, one or more physical-chemical processes, or a combination of any two or more thereof.

49. The system of claim 41, wherein the core is naturally occurring.

50. The system of claim 41, wherein the core comprises one or more hydrophobic polymers, gypsum, lignocellulose, hemicellulose, basalt, bauxite, graphite, cera alba, bone, or a combination of any two or more thereof.

51. The system of claim 41, wherein the porous and non-reactive binding agent further comprises one or more magnetic nanoparticles, carbon, one or more carbon-containing compounds, one or more ceramics, one or more metals, one or more metal oxides, one or more polymers, one or more zeolites, one or more ion exchange resins, or a combination of any two or more thereof.

52. The system of claim 51, wherein the porous and non-reactive binding agent comprises one or more magnetic nanoparticles and one or more ion exchange resins.

* * * * *

UNITED STATES PATENT AND TRADEMARK OFFICE
CERTIFICATE OF CORRECTION

PATENT NO. : 12,503,376 B2
APPLICATION NO. : 18/160687
DATED : December 23, 2025
INVENTOR(S) : Joshua P. Boltz et al.

Page 1 of 1

It is certified that error appears in the above-identified patent and that said Letters Patent is hereby corrected as shown below:

In the Claims

In Claim 11, Line 12, please update "one or more bases and one or more bases" to "one or more bases and one or more brines".

In Claim 27, Line 63, please replace "two more" with "two or more".

In Claim 28, Line 65, please replace "two more" with "two or more".

Signed and Sealed this
Third Day of February, 2026

John A. Squires
*Director of the United States Patent and Trademark Office*